(12) United States Patent
Tubb et al.

(10) Patent No.: US 8,525,642 B2
(45) Date of Patent: Sep. 3, 2013

(54) METHODS AND SYSTEMS FOR COMMUNICATION PROTOCOL FOR DISTRIBUTED ASSET MANAGEMENT

(75) Inventors: Earl Fred Tubb, Santa Cruz, CA (US); Tom Inokuchi, San Juan Bautista, CA (US)

(73) Assignee: iControl, Inc., Santa Clara, CA (US)

( * ) Notice: Subject to any disclaimer, the term of this patent is extended or adjusted under 35 U.S.C. 154(b) by 369 days.

(21) Appl. No.: 12/874,062

(22) Filed: Sep. 1, 2010

(65) Prior Publication Data

US 2010/0329232 A1    Dec. 30, 2010

Related U.S. Application Data

(63) Continuation-in-part of application No. 12/775,444, filed on May 6, 2010.

(60) Provisional application No. 61/238,968, filed on Sep. 1, 2009, provisional application No. 61/176,862, filed on May 8, 2009.

(51) Int. Cl.
*G05B 19/00* (2006.01)

(52) U.S. Cl.
USPC ........................................................ 340/5.73

(58) Field of Classification Search
USPC ................ 340/5.73, 12.5; 370/349, 401, 389
See application file for complete search history.

(56) References Cited

U.S. PATENT DOCUMENTS

| | | | |
|---|---|---|---|
| 6,683,865 B1 * | 1/2004 | Garcia-Luna-Aceves et al. | 370/349 |
| 7,450,550 B2 | 11/2008 | Jin | 370/338 |
| 7,525,966 B2 | 4/2009 | Fujinami | 370/390 |
| 7,564,842 B2 * | 7/2009 | Callaway et al. | 370/389 |
| 8,036,152 B2 * | 10/2011 | Brown et al. | 370/311 |
| 2006/0285507 A1 | 12/2006 | Kinder et al. | 370/310 |

FOREIGN PATENT DOCUMENTS

KR      10-0586845      6/2006

OTHER PUBLICATIONS

ZigBee Alliance; "ZigBee Specification"; ZigBee Document 053474r06, Version 1.0; Jun. 27, 2005.

* cited by examiner

*Primary Examiner* — Vernal Brown
(74) *Attorney, Agent, or Firm* — Martine Penilla Group, LLP

(57) ABSTRACT

A sending device generates a MAC frame to be transmitted over a wireless network. The MAC frame indicates a frame transmission type. A payload portion of the MAC frame is defined in accordance with a payload specification of a distributed asset management protocol corresponding to the indicated frame transmission type. The MAC frame is transmitted over the wireless network and received by a receiving device that is defined to recognize the MAC frame as the indicated frame transmission type. The receiving device is defined to process the payload portion of the MAC frame in accordance with the payload specification of the distributed asset management protocol corresponding to the indicated frame transmission type. Network discovery includes successively transmitting the MAC frame at a defined interval during a first period of time. Then, the MAC frame transmission is ceased for a second period of time. Then, transmission of the MAC frame resumes.

22 Claims, 21 Drawing Sheets

| Device Type Data Value | Device Type |
|---|---|
| 0x00 | Unspecified |
| 0x10 | Fixed Reader |
| 0x40 | Mobile Reader |
| 0x50 | Handheld |
| 0x60 | Tag (Mesh Network) |
| 0x80-0xFF | Reserved |
| All others | Reserved for Future Use |

Fig. 3C

| MSB Setting | Meaning |
|---|---|
| 0x00 | No Beacon Payload Data |
| 0x80 | Bit indicates other 7 bits interpreted as bitmask |
| All others | Reserved |

Fig. 3D

| Bitmask Value | Data Field Includes |
|---|---|
| 0x01 | Device Date and Time (7 bytes)<br>MM/DD/YY Wd HH:MM:SS (GMT)<br>- MM: month 1-12<br>- DD: day 1-31<br>-YY: year 0-99<br>-Wd: Weekday 0-6<br>-HH: hour 0-23<br>-MM: minute 0-59<br>-SS: second 0-59<br>Example: 9/4/9 5 12:30:20 |
| 0x02 | Device Identification (20 bytes)<br>- User Definable (Pad with spaces)<br>Example: "APL US LA East Gate" |
| 0x04 | Device Location (12 bytes)<br>Latitude (deg), Longitude (deg), Altitude (meters)<br>- Single precision IEEE floating point<br>Example: 37.55 -121.5 1000.0 |
| 0x08 | Device Velocity (12 bytes)<br>- Single precision IEEE floating point<br>- Velocity North (meters/second)<br>- Velocity East (meters/second)<br>- Velocity Down (meters/second) |
| 0x10 | Device Differential GPS Correction<br>- Differential GPS correction relative to a reader<br>- RTCM 104 DGPS data for differential GPS correction |
| All others | Reserved for future use |

Fig. 3E

| Device Type 317 | Beacon Type 319 | Alt. Channel 321 | Beacon Interval 323 | Assoc. Timeout 325 | Resp. Interval 327 | Data Length 329 | Time Fields (7 bytes) | Identification (20 bytes) | CRC (2 bytes) 333 |
|---|---|---|---|---|---|---|---|---|---|
| 0x10 | 0x83 | X | X | X | X | 29 | MM/DD/YY Wd HH:MM:SS | "APL LA" (14 bytes zero pad) | <n,n> |

The Time Fields and Identification columns are bracketed together as 331.

X: not relevant to example

Fig. 3F

| Message Type Data Value | Message Type |
|---|---|
| 0x00 | Command (Directive) |
| 0x01 | Data (status, tracking, stored data, etc.) |
| 0x02 | ACK Status (or NAK) |
| 0x03-0x7F | Reserved |
| 0x80-0xFE | Reserved |
| 0xFF | Broadcast Network Discovery |

Fig. 4B

METHODS AND SYSTEMS FOR COMMUNICATION PROTOCOL FOR DISTRIBUTED ASSET MANAGEMENT

CLAIM OF PRIORITY

This application claims priority under 35 U.S.C. 119(e) to U.S. Provisional Patent Application No. 61/238,968, filed Sep. 1, 2009, entitled "Methods and Systems for Communication Protocol for Distributed Asset Management." The disclosure of the above-identified provisional patent application is incorporated herein by reference.

This application is also a continuation-in-part application under 35 U.S.C. 120 of prior U.S. patent application Ser. No. 12/775,444, filed May 6, 2010, entitled "mLOCK Device and Associated Methods," which claims priority under 35 U.S.C. 119(e) to U.S. Provisional Patent Application No. 61/176,862, filed May 8, 2009, entitled "mLOCK Device and Associated Methods." The disclosures of the above-identified patent applications are incorporated herein by reference.

BACKGROUND OF THE INVENTION

In modern global commerce, it is becoming more important than ever to have an ability to track and monitor assets and their security as they move about the world. Additionally, government and/or commercial institutions may have an interest in knowing the current location of a particular asset, a security status of a particular asset, and in having an accurate and reliable historical record of a particular asset's travels and corresponding security status during those travels. A maritime transport container represents one of many examples of an asset to be tracked and monitored as it travels around the world. Information about a particular asset, such as its current location, where it has traveled, how long it spent in particular locations along its route, and what conditions it was exposed to along its route, can be very important information to both commercial and governmental entities. To this end, a device is needed to track and monitor an asset anywhere in the world, to collect and convey information relevant to the asset's experience during its travels, and to remotely monitor and control the asset's security. Additionally, a communication protocol is needed to enable accurate and efficient communication with such an asset tracking and monitoring device.

SUMMARY OF THE INVENTION

In one embodiment, a method is disclosed for wireless network operation. The method includes an operation for successively transmitting a communication frame at a defined interval during a first period of time. Then, after the first period of time, the method includes an operation for ceasing transmission of the communication frame for a second period of time. Then, after the second period of time, the method reverts back to successively transmitting the communication frame at the defined interval during the first period of time, and so on.

In one embodiment, a method is disclosed for communicating data over a wireless network in accordance with a distributed asset management protocol. The method includes operating a sending device to generate a medium access control (MAC) frame to be transmitted over the wireless network. Generating the MAC frame includes setting a frame control field of the MAC frame to indicate a frame transmission type. Generating the MAC frame also includes defining a payload portion of the MAC frame in accordance with a payload specification of the distributed asset management protocol corresponding to the indicated frame transmission type. The method also includes operating the sending device to transmit the generated MAC frame over the wireless network. In the method, a receiving device is operated to receive the MAC frame over the wireless network. The method also includes operating the receiving device to recognize the MAC frame as the indicated frame transmission type. The method further includes operating the receiving device to process the payload portion of the MAC frame in accordance with the payload specification of the distributed asset management protocol corresponding to the indicated frame transmission type.

In one embodiment, a device is defined to communicate data over a wireless network in accordance with a distributed asset management protocol. The device includes a wireless transceiver and a processor. The processor is defined operate in conjunction with the wireless transceiver to transmit and receive wireless communications in accordance with the distributed asset management protocol. The processor includes a transmission module defined to generate a MAC frame to be transmitted over the wireless network. Generating the MAC frame includes setting a frame control field of the MAC frame to indicate a frame transmission type. Generating the MAC frame also includes defining a payload portion of the MAC frame in accordance with a payload specification of the distributed asset management protocol corresponding to the indicated frame transmission type. The transmission module is also defined to direct the wireless transceiver to transmit the generated MAC frame over the wireless network. The processor also includes a reception module defined to process MAC frames received through the wireless transceiver from the wireless network. The reception module is defined to recognize the frame transmission type of the received MAC frame. Also, the reception module is defined to process the payload portion of the received MAC frame in accordance with the payload specification of the distributed asset management protocol corresponding to the recognized frame transmission type.

Other aspects and advantages of the invention will become more apparent from the following detailed description, taken in conjunction with the accompanying drawings, illustrating by way of example the present invention.

DESCRIPTION OF THE DRAWINGS

FIG. 3C shows a chart of Device Type Field data values for different types of sending devices, in accordance with one embodiment of the present invention;

FIG. 3D shows a chart of MSB setting within the Beacon Type Field and its corresponding meaning, in accordance with one embodiment of the present invention;

FIG. 3E shows a chart of bitmask values used in the Beacon Type Field and their corresponding data types to be considered present in the Data Field, in accordance with one embodiment of the present invention;

FIG. 3F shows a Beacon Type Field bitmask example, in accordance with one embodiment of the present invention;

FIG. 4B shows a chart of Message Type Field values and their corresponding data descriptions, in accordance with one embodiment of the present invention;

DETAILED DESCRIPTION OF THE INVENTION

Figure 1A:
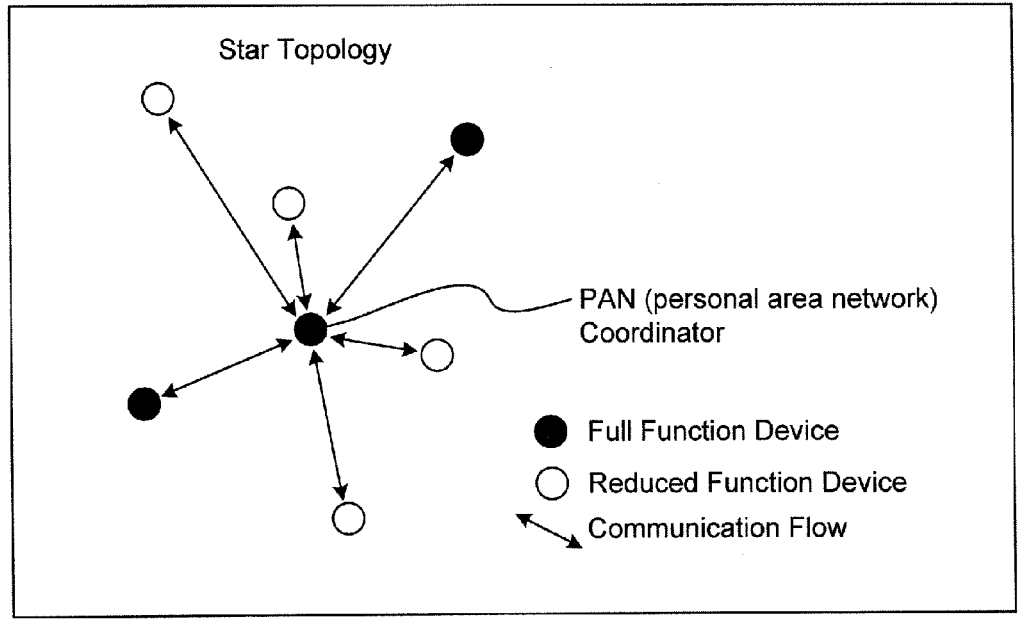
FIG. 1A shows a diagram of an example star topology within the network, in accordance with one embodiment of the present invention.

In the following description, numerous specific details are set forth in order to provide an understanding of the present invention. It will be apparent, however, to one skilled in the art that the present invention may be practiced without some or all of these specific details. In other instances, well known process operations have not been described in detail in order not to unnecessarily obscure the present invention.
Overview A distributed asset management communication (DAMC) protocol is described herein. The DAMC protocol can be used with essentially any device the utilizes an IEEE 802.15.4 ("802.15.4" hereafter) compliant integrated circuit (IC) radio and includes sufficient computing and associated memory capability. The DAMC protocol is defined for implementation within the 802.15.4 protocol. Also, the DAMC protocol is defined to extend the functionality of the 802.15.4 protocol.

More specifically, the DAMC protocol includes specific communication frame payload formats and content that is unique to the DAMC protocol and that provides for distributed asset management and information exchange. Additionally, the DAMC protocol specifies variations, i.e., extensions, of 802.15.4 communication frames to enable distributed asset management and information exchange, without conflicting with 802.15.4 specifications that provide for normal communication processes to occur between 802.15.4 compliant devices. The DAMC protocol described herein can be used with reader devices, lock devices, tag devices, handheld device, or essentially any other properly equipped device that utilizes an 802.15.4 compliant IC radio and includes sufficient computing and associated memory capability.

It should be understood that although the DAMC protocol is defined for implementation within the 802.15.4 protocol, the DAMC protocol does not require strict adherence to all aspects of the 802.15.4 standard in all embodiments. That is to say, in some embodiments, the DAMC protocol can be implemented with devices that comply with appropriate portions of the 802.15.4 standard. However, in one embodiment, the DAMC protocol is implemented with devices that fully comply with the 802.15.4 standard. Also, the DAMC protocol can be implemented within a communication network that includes multiple device variations, in which some devices comply more or less with the 802.15.4 standard than other devices, so long as each device complies with the portions of the 802.15.4 standard that are germane to implementation of the DAMC protocol. Additionally, the DAMC protocol may be implemented with devices that operate in a manner consistent with the germane portions of the 802.15.4 standard, although these devices do not claim to be compliant with the 802.15.4 standard, or portions thereof. For discussion purposes, the 802.15.4 IC radio or its equivalent with regard to implementation of the DAMC protocol is referred to hereafter as a "compliant radio."

Logistical tracking and monitoring tag devices for distributed assets, such as shipping containers, have no access to external power sources or method for recharging batteries while deployed. Therefore, asset tracking tag devices require significant power saving modes of operation in which the tag devices disable their communication system and can remain asleep for over 98% of their deployment time. To complicate asset tracking tag device utilization, communication protocols for asset tracking tag devices require rapid response times (less than 1 second) by the tag devices that normally have their communication receivers disabled. For example, these types of rapid response time requirements can exist at weigh stations and entrance gates that have reader devices, where vehicle velocities are high during "drive-by" tag device reads by the reader devices. In addition, logistics networks can maintain a high number of tag devices, e.g., 1,000 to 10,000 tag devices, in an active network in shipping terminals or distribution centers. For these applications, data reporting is relatively infrequent, and network management is necessary to deal with network traffic, power management and security.

The DAMC protocol described herein defines methods and systems for adaptive network management of tag devices that utilize compliant radios. The DAMC protocol is implemented using a well-defined specification for radio beacon, broadcast, command, data, and acknowledgement frame payloads which provide instructions for data reporting frequency, power management, radio channel utilization, and network maintenance, among other items. With the DAMC protocol, tag devices can operate with a low latency response time while maintaining a 1% to 2% receiver duty cycle. In addition, power management is optimized by eliminating unnecessary tag device transmissions, balancing network traffic across multiple radio channels, and by identifying network arrivals and departures to adjust modes of tag device operation.

It should be understood that the term "tag device" as used herein refers to a device that is configured to utilize a compliant radio and that includes sufficient computing and associated memory capability to implement the DAMC protocol, and that is defined to implement the DAMC protocol. Also, for discussion purposes, the term "reader device" is used herein to refer to any type of communication device that is connected to a communication network and that is defined to transmit information to and receive information from a tag device in accordance with the DAMC protocol.

Network Physical Layer

The DAMC protocol is defined to be used within a wireless communication network that can include any number tag and reader devices. A physical layer of the wireless communication network includes compliant radios in both the tag devices and the reader devices. The DAMC protocol described herein is defined to be implemented through the payload portions of communication packets normally transmitted between compliant radios of the tag and reader devices.

Compliant radios are designed for low power operation. For example, in one embodiment, the IC of the compliant radio utilizes a 1.8 V (volt) core. Also, with the compliant radio, a single command can be used to disable the crystal, reduce power, and save configuration data. In many embodiments, the compliant radio is defined as a system on chip design that is low cost and readily available from multiple manufacturers. Additionally, the compliant radio communication protocol supports sleep modes of operation between network beacons, wherein the network beacon frequency is user-controllable. Also, network beacons include wake cycles. In some embodiments, the compliant radio can include integrated security in the form of hardware implemented AES 128 (Advanced Encryption Standard 128) encryption that is compliance tested.

Compliant radios are internationally accepted within the ISM (industrial, scientific, and medical) band of radio frequency covering the frequency range of 2.405 GHz (gigaHertz) to 2.483 GHz. In one embodiment, there are 16 available channels between 2.405 GHz and 2.483 GHz. And, each channel supports a data rate of 250,000 bits per second. Also, in one embodiment, radio frequency options of 860 MHz and 916 MHz are excluded from use with the DAMC protocol. Also, compliant radios implement a Carrier Sense Multiple Access (CSMA) method of channel conflict resolution which complements implementation of the DAMC protocol. In the CSMA method, hold off can be up to 10 ms (milliseconds). Also, compliant radio networks can utilize DSSS (Direct Sequence Spread Spectrum) modulation along with QPSK (quadriphase phase-shift keying). Moreover, the compliant radio works well in reflective environments.

In one embodiment, tag devices within the network have a transmit power of about 10 dBm (power ratio in decibels (dB) of the measured power referenced to one milliwatt (mW)). However, it should be understood that any tag device within the network may have a transmit power larger or smaller than 10 dBm. Also, reader devices within the network can have a transmit power that varies from reader-to-reader, per local regulations. In one embodiment, a fixed (immobile) reader device having a 360 field-of-view (FOV) and positioned at about 30 m (meters) above sea level can have a range extending from 1 km (kilometer) to 3 km. However, it should be appreciated that reader devices within the network can vary substantially in purpose and correspondingly in range. For example, a lane or exit reader device can be operated in a directional and controlled manner to have a range extending from 3 m to 100 m, depending on its operational requirements.

Within the network, a typical response time of a tag device from its sleep state is about 1 second. However, depending on the particular tag device configuration and system, it should be understood that the response time from sleep state can be larger or smaller than 1 second. Also, during network communication, a maximum size packet length can be transmitted in about 4 ms. And, a complete bidirectional communication transaction, i.e., transmission of maximum size packet length and return transmission of ACK (acknowledgment), can be done in less than 7 ms. It should be understood, however, that transmission times within the network can vary from the 4 ms and 7 ms values noted above, depending of the network condition and any other factors that can influence real-time network communication.

Additionally, the DAMC protocol provides for network management to control the number of tag devices in communication with a given reader device. In one embodiment, network management features of the DAMC protocol provide for application-based management of tag device density for a given reader device. For example, through use of the DAMC protocol to set network management features, such as beacon interval and report interval, in combination with the compliant radio features of CSMA and high transmission rate, it is possible for tens of thousands of tag devices to be handled by a single reader device in a single location.

Network Topology

Figure 1B:
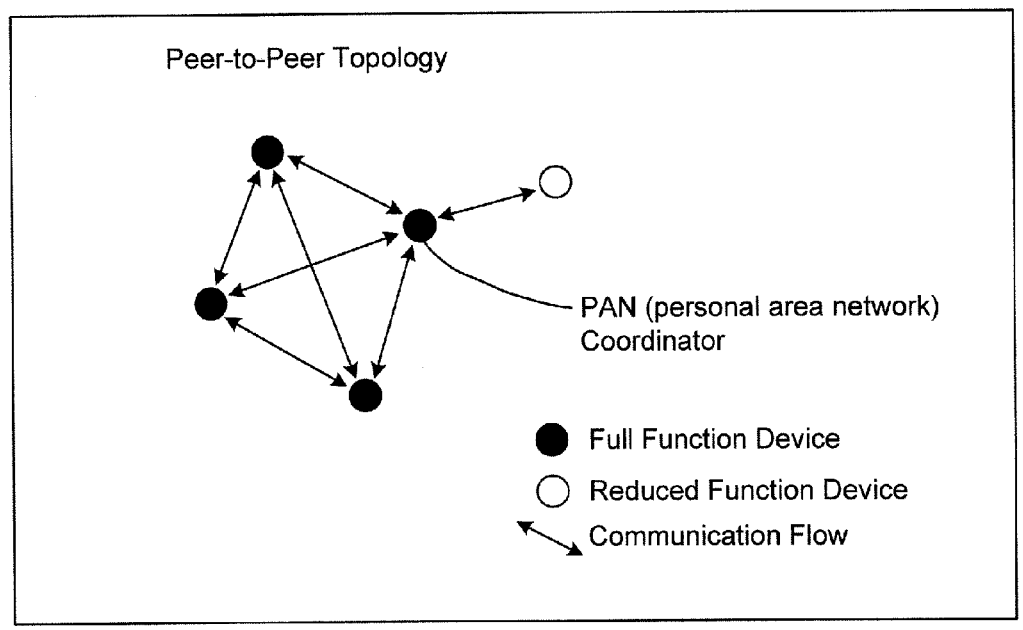
FIG. 1B shows a diagram of an example peer-to-peer topology within the network, in accordance with one embodiment of the present invention.

The wireless communication network over which compliant radios communicate can include peer-to-peer topologies (i.e., point-to-point topologies), star topologies (i.e., point-to-multi-point topologies), repeater configurations (for truck communications), and any combination thereof, among others. FIG. 1A shows a diagram of an example star topology within the network, in accordance with one embodiment of the present invention. FIG. 1B shows a diagram of an example peer-to-peer topology within the network, in accordance with one embodiment of the present invention. Within the network, tag devices can be deployed in essentially any number of ways. In one embodiment, tag devices are deployed on distributed assets to enable tracking and management of the distributed assets. For example, tag devices can be affixed to respective shipping containers to enable tracking and monitoring of the shipping containers throughout the world.

In one embodiment, tag devices that are fixed to movable assets, such as shipping containers, are defined to operate in accordance with a tag talk last (TTL) procedure in which the tag device needs to hear a reader device transmission (e.g., broadcast command or network beacon) before activating its transmitter. Under the TTL procedure, a tag device will not initiate network communication unless a reader device emits a broadcast command or network beacon. For example, under the TTL procedure, a tag device will not attempt to join a given network unless it receives a transmission from a reader device within the given network. However, under the TTL procedure, once a tag device joins a network, the tag device may send transmissions unilaterally within the network for some types of applications and/or purposes. For example, a tag device having already joined a given network may unilaterally send transmissions within the network concerning low latency alarms (important alarms), exits (movement past exit waypost), entrances (movement past entrance waypost), etc. Also, under the TTL procedure, successful communication between a tag device and a local reader device implies local certification of the tag device on the communication network to which the local reader device is connected.

DAMC Network Discovery

The DAMC protocol includes two methods by which a tag device can discover and communicate with a network within range. The first method is for beacon network discovery and communication. The second method is for broadcast network discovery and communication.

DAMC Beacon Network Discovery

A beacon based network that operates in accordance with the beacon method of the DAMC protocol for network discovery is typically used for long range reader devices. The beacon based network can include many devices and can support sustained network connections. Also, the beacon based network provides mixed types of data connections for multiple applications. For example, the beacon based network can be used for data uploads (from tag to reader), multiple encryption methods, tag authentication, and network access control, among other types of applications. Additionally, the beacon based network provides for network load balancing via channel allocation and TDMA (Time Division Multiple Access), in which several tag devices can share a same frequency channel by dividing the signal into different time slots allocated per tag device.

The beacon method of the DAMC protocol utilizes compliant radio beacon frames (e.g., MAC frames of beacon type, as described below), with the DAMC protocol implemented through the beacon payload portion of the beacon frame. In the beacon method, the compliant radio beacon frames are processed according to the compliant radio specification. However, the DAMC protocol payload within the beacon frame is processed by the network device in accordance with the DAMC protocol, which the network device is defined/programmed to implement.

In one embodiment, the beacon method of the DAMC protocol does not allow for a guaranteed time slot (GTS) as is normally available with compliant radio beacon frame transmission. Also in one embodiment, the beacon method of the DAMC protocol does not allow for short address assignment as is normally available with compliant radio beacon frame transmission. Therefore, in this embodiment, the tag device should be capable of operating without a short address.

In the beacon method, network access is controlled by association request and association response. The beacon method provides for operation of a reader device to deny network access to a tag device, when appropriate. Also, the beacon method provides for management and exchange of authentication data and encryption keys when a tag device joins a network through communication with a reader device. Power and device modes of operation can also be exchanged between tag and reader devices as part of the association request. Once a tag device is associated with a network through a reader device, the reader device can command the tag device at-will in a peer-to-peer manner.

The beacon method of the DAMC protocol implements a beacon timing method which allows a tag device to recognize a received compliant radio beacon frame, having the DAMC protocol payload embedded therein. In response to recognizing receipt of the beacon frame having the DAMC protocol payload therein, the tag device is defined to attempt to join the network from which the beacon frame was transmitted.

Figure 2A:
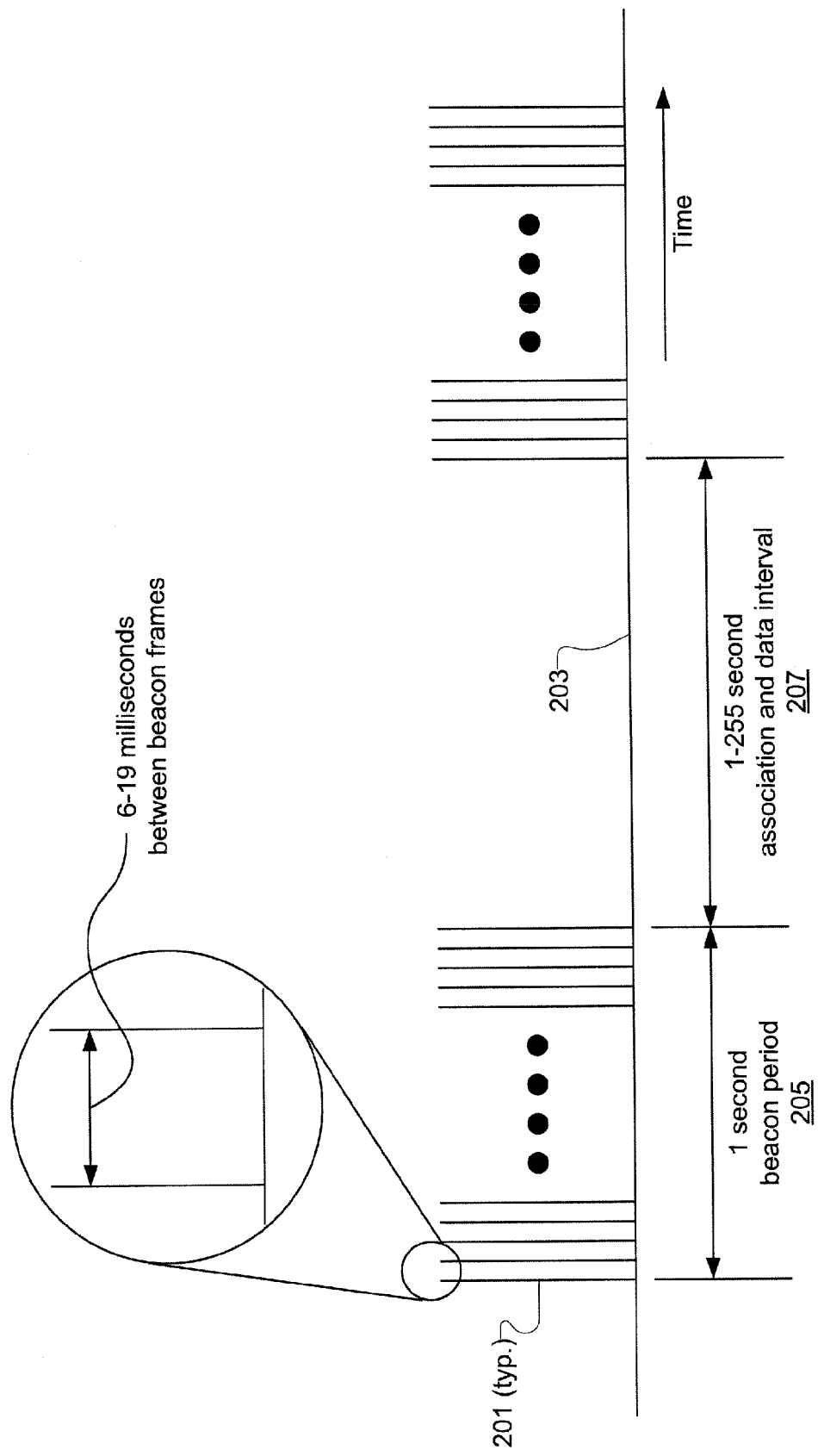
FIG. 2A shows a beacon frame timing diagram of the beacon method of the DAMC protocol, in accordance with one embodiment of the present invention.

FIG. 2A shows a beacon frame timing diagram of the beacon method of the DAMC protocol, in accordance with one embodiment of the present invention. With the DAMC protocol, beacon frames are emitted periodically from reader devices to announce network availability to any tag devices that may be in range of the reader devices. In one embodiment of the DAMC protocol, beacon frames are transmitted on hailing channels 15, 17, 21, and 23 of the compliant radios within the network. However, it should be appreciated that the DAMC protocol payload of a beacon frame can be defined to redirect an asset (i.e., tag device) to an alternate channel for subsequent communication. In one embodiment, redirection of assets to alternate channels is performed based on real-time network load conditions.

In the diagram of FIG. 2A, each vertical line 201 spaced along the time line 203 represents transmission of a beacon frame from a reader device within the network. In accordance with the DAMC protocol, a beacon period is defined as period of time during which a number of beacon frames are successively transmitted at a defined interval. In the embodiment of FIG. 2A, the beacon period 205 is defined as a 1 second period of time during which beacon frames are successively transmitted at an interval that can be defined within a range extending from 6 ms to 19 ms. The DAMC protocol also specifies a dwell time between beacon periods, during which network association and data transmissions can occur. In the embodiment of FIG. 2A, the dwell time 207 can be defined within a range extending from 1 s to 255 s.

To preserve its power supply, a tag device can be defined to awake from sleep state for a short period of time at a given interval of time to enable the tag device to receive any transmissions from in-range sources, i.e., reader devices. For example, a tag device may be defined to awake for 20 ms out of each second. While awake, the tag device is operated to listen for and receive any transmission from in-range reader devices. It should be appreciated that the beacon transmission schedule (i.e., combination of beacon period, beacon frame interval, and dwell time) of the DAMC protocol is defined to provide for sufficient probability of a tag device being in its wake state and receiving a beacon frame transmission from a reader device during transit of the tag device through the transmission range of the reader device.

When a tag device receives a beacon frame, the tag device will determine whether or not it is already connected to the network associated with the received beacon frame. In other words, the tag device will determine whether or not it is already connected to the network to which the reader device responsible for transmitting the beacon frame is connected. If the tag device is already connected to the beacon transmitting reader device's network, the tag device will remain connected to that network and will execute any instructions provided to it within the DAMC protocol payload of the received beacon frame. If the tag device is not already connected to the beacon transmitting reader device's network, the tag device will attempt to join that network through communication with the beacon transmitting reader device. In the DAMC protocol, the tag device assumes that the beacon transmitting reader device is licensed to operate at its transmitting location.

If a tag device is connected to a beacon network and does not receive a beacon frame for a specified period of time, the tag device can be operated to assume that it is disconnected from the beacon network. Also, the tag device can be instructed as to how often it should send a response to received beacon frames once connected to the beacon network. In one embodiment, tag device response to a beacon frame is based on how often the tag device receives beacon frames. It should be appreciated that the power consumed by the tag device to process instructions in the DAMC protocol payload of a received beacon frame is very small compared to the power consumed by the tag device in transmitting a response to a received beacon frame. Therefore, the tag device may be instructed to only transmit a response to a received beacon frame after receiving a specified number of beacon frames. For example, once connected to a beacon network, the tag device may be instructed to hold off on responding to a received beacon frame until it has received 100 beacon frames.

DAMC Broadcast Network Discovery

A broadcast based network that operates in accordance with the broadcast method of the DAMC protocol for network discovery is primarily intended for use with short range reader devices and high-speed communication. For example, the broadcast based network may include reader devices such as gate readers, weigh station readers, lane readers, among others. In one example application, the broadcast based network is used for high-speed communication of tag status data from a tag device to a short-range reader device. In one embodiment, tag device status data returned by way of the broadcast method is usually unencrypted and includes default status packets. However, in some embodiments, the broadcast method can support encryption of transmitted data. In one embodiment, the broadcast method can be efficiently utilized for transit reader devices having connection times from 1 second to 1 hour. Also, there is no implied long-term relationship between a tag device and a reader device under the broadcast method of the DAMC protocol.

The broadcast method of the DAMC protocol implements a broadcast timing method which allows a tag device to recognize a received compliant radio broadcast packet, having the DAMC protocol broadcast payload embedded therein. In response to recognizing receipt of the broadcast packet having the DAMC protocol broadcast payload therein, the tag device is defined to respond to the broadcast packet.

Figure 2B:
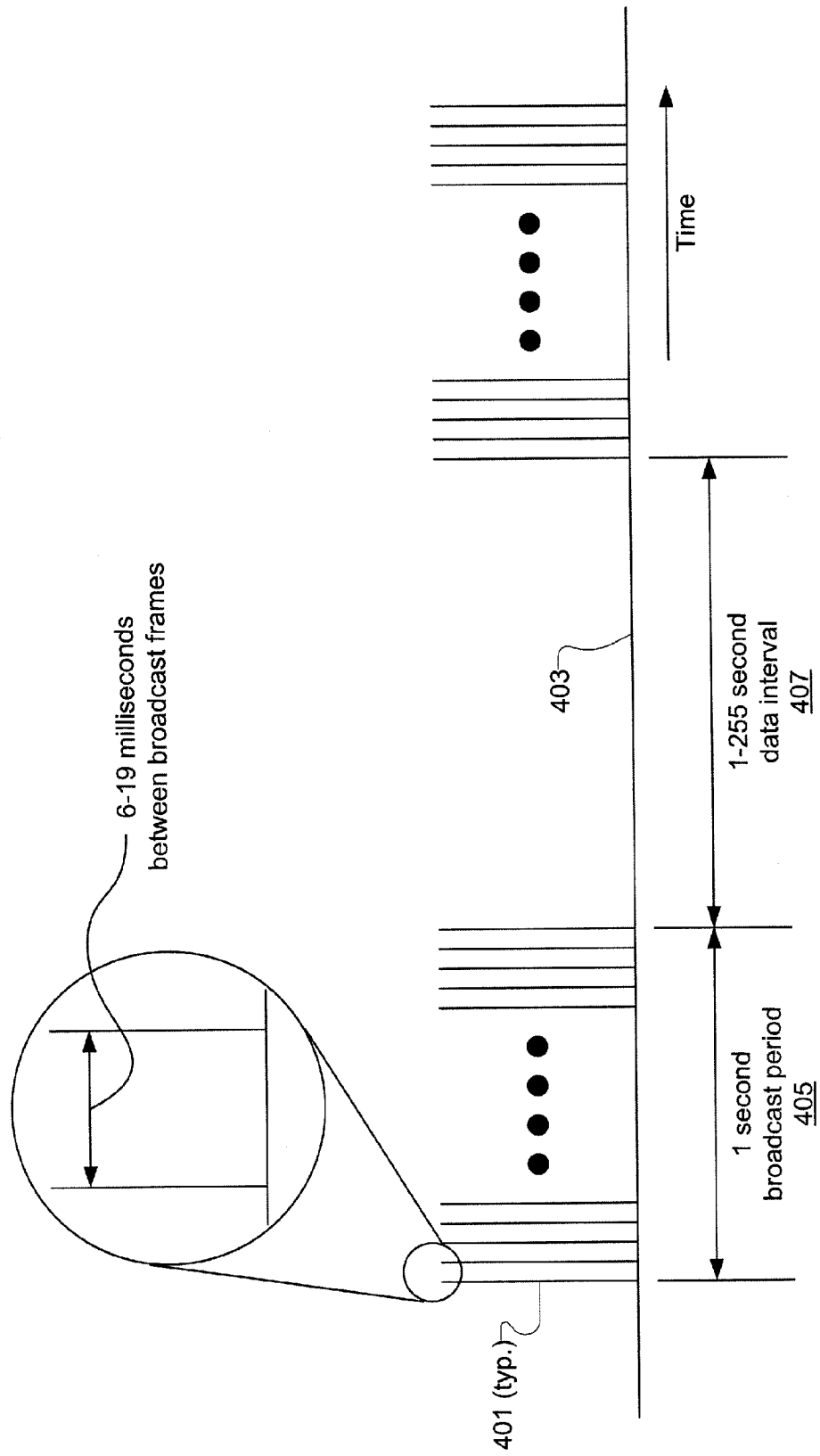
FIG. 2B shows a broadcast packet timing diagram of the broadcast method of the DAMC protocol, in accordance with one embodiment of the present invention.

FIG. 2B shows a broadcast packet timing diagram of the broadcast method of the DAMC protocol, in accordance with one embodiment of the present invention. With the DAMC protocol, broadcast packets are emitted periodically from reader devices to announce network availability to any tag devices that may be in range of the reader devices. In one embodiment of the DAMC protocol, broadcast packets are transmitted on hailing channels 15, 17, 21, and 23 of the compliant radios within the network. However, it should be appreciated that the DAMC protocol broadcast payload of a broadcast packet can be defined to redirect an asset (i.e., tag device) to an alternate channel for subsequent communication. In one embodiment, redirection of assets to alternate channels is performed based on real-time network load conditions.

In the diagram of FIG. 2B, each vertical line 401 spaced along the time line 403 represents transmission of a broadcast packet from a reader device within the network. In accordance with the DAMC protocol, a broadcast period is defined as period of time during which a number of broadcast packets are successively transmitted at a defined interval. In the embodiment of FIG. 2B, the broadcast period 405 is defined as a 1 second period of time during which broadcast packets are successively transmitted at an interval that can be defined within a range extending from 6 ms to 19 ms. The DAMC protocol also specifies a dwell time between broadcast packets, during which network association and data transmissions can occur. In the embodiment of FIG. 2B, the dwell time 407 can be defined within a range extending from 1 s to 255 s.

It should be appreciated that the broadcast packet transmission schedule (i.e., combination of broadcast period, broadcast packet interval, and dwell time) of the DAMC protocol is defined to provide for sufficient probability of a tag device being in its awake state and receiving a broadcast packet transmission from a reader device during transit of the tag device through the transmission range of the reader device.

Medium Access Control (MAC) Frame

Figure 3A:
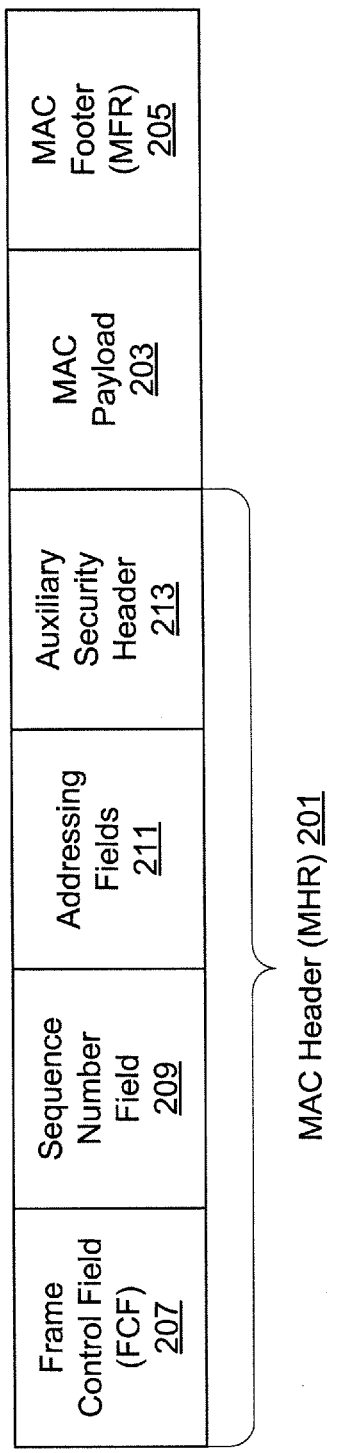
FIG. 3A shows a general MAC frame format of the 802.15.4 protocol.

The DAMC protocol is implemented within the 802.15.4 protocol, which includes a MAC frame format used for communication between compliant radio equipped devices. FIG. 3A shows a general MAC frame format of the 802.15.4 protocol. The MAC frame includes a MAC header (MHR) portion 201, a MAC payload portion 203, and MAC footer (MFR) portion 205.

The MHR 201 includes a frame control field (FCF) 207 that contains information for defining a frame type, addressing fields, and other control flags. Within the 802.15.4 protocol, the frame type specified within the FCF 207 can be either a beacon frame, a data frame, an acknowledgement (ACK/NAK) frame, a command frame, or another type of frame. It should be noted, however, that the DAMC protocol extends the 802.15.4 protocol to also including a broadcast frame type. The FCF 207 includes a flag to indicate whether or not the device that is sending the frame has more data for the receiving device, to be sent in subsequent frames. The FCF 207 also includes a flag to indicate whether or not an acknowledgement is required from the receiving device upon receipt of either a data or a command frame. The FCF 207 also includes other data pertinent to modes of frame destination and source addressing.

The MHR 201 also includes a sequence number field 209 that contains information specifying the sequence identifier for the frame. In the case of a beacon frame, the sequence number field 209 specifies a beacon sequence number. In the case of either a data frame, an acknowledgement frame, a command, or a broadcast frame, the sequence number field 209 specifies a data sequence number that is used to match a given acknowledgement frame to its corresponding data, command, or broadcast frame.

The MHR 201 also includes addressing fields 211 to specify addresses for the frame destination and for the frame source. The frame destination addresses can be specified as an identifier of a personal area network (PAN) of the frame's intended recipient and/or as an identifier of the intended recipient itself The frame source addresses can be specified as an identifier of a personal area network (PAN) of the frame's originator and/or as an identifier of the originator itself. The MHR 201 further includes an auxiliary security header field 213 which specifies information required for security processing, such as how the frame is protected and what keying information is required by the security methods.

The MAC payload portion 203 of the frame includes information specific to the frame type specified in the FCF 207. And, with the DAMC protocol, the MAC payload portion 203 includes DAMC protocol-specific information for the specified frame type that is formatted in accordance with the requirements of the DAMC protocol. Thus, with the beacon frame type specified in the FCF 207, the MAC payload portion 203 includes DAMC protocol-specific information and formatting for DAMC protocol beacon frames. With the broadcast frame type specified in the FCF 207, the MAC payload portion 203 includes DAMC protocol-specific information and formatting for DAMC protocol broadcast frames. With the data frame type specified in the FCF 207, the MAC payload portion 203 includes DAMC protocol-specific information and formatting for DAMC protocol data frames. With the command frame type specified in the FCF 207, the MAC payload portion 203 includes DAMC protocol-specific information and formatting for DAMC protocol command frames. And, with the acknowledgement frame type specified in the FCF 207, the MAC payload portion 203 includes DAMC protocol-specific information and formatting for DAMC protocol acknowledgement frames.

The MFR portion 205 of the MAC frame includes frame check sequence (FCS) data. In one embodiment, the FCS data is two bytes in length and contains a 16-bit ITU-T CRC value (16-bit Telecommunication Standardization Sector of the International Telecommunication Union Cyclic Redundancy Check value). In one embodiment, the FCS is calculated over the MHR 201 and MAC payload portion 203 of the MAC frame.

DAMC Protocol Beacon Frame

Figure 3B:
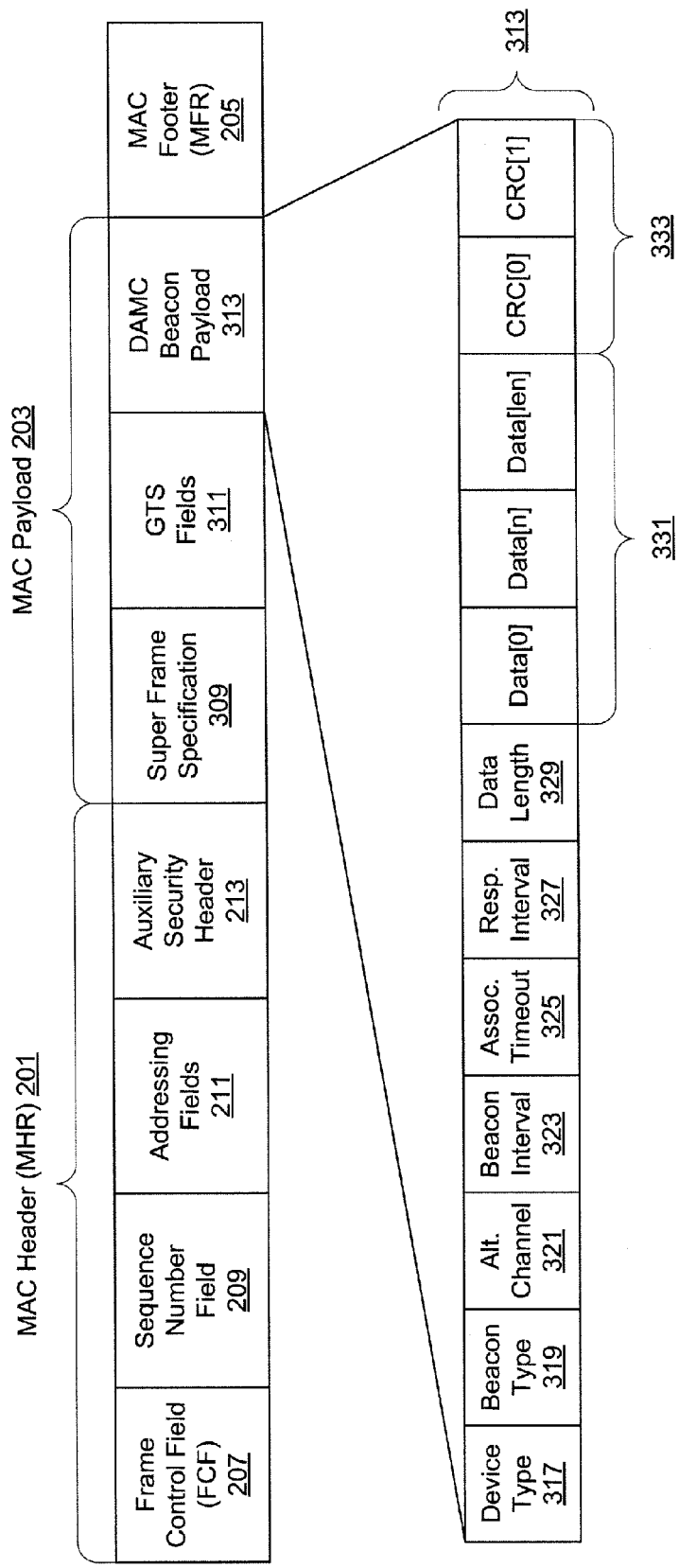
FIG. 3B shows a beacon frame structure of the DAMC protocol, in accordance with one embodiment of the present invention.

FIG. 3B shows a beacon frame structure of the DAMC protocol, in accordance with one embodiment of the present invention. The DAMC protocol beacon frame structure includes the following fields:

FCF 207
Sequence Number Field 209
Address Fields 211
Auxiliary Security Header Field 213
MAC payload portion 203, including:
 Super Frame Specification Field 309
 GTS (Guaranteed Time Slot) Field 311
 DAMC Protocol Beacon Payload 313
MFR 205, including FCS.

The FCF 207, sequence number field 209, address fields 211, auxiliary security header field 213, and MFR 205 are the same as discussed above with regard to the MAC frame structure. However, the MAC payload portion 203 includes data and formatting that is specific to the DAMC protocol. Specifically, the MAC payload portion 203 includes a DAMC protocol beacon payload 313 that is defined in accordance with the DAMC protocol. Prior to the DAMC protocol beacon payload 313, the MAC payload portion 203 of the beacon frame includes the super frame specification field 309 and the GTS field 311. The DAMC protocol does not allow for use of guaranteed time slots. Therefore, the GTS field 311 will be set to indicate no GTS. Also, the DAMC protocol does not allow for use of short address assignment in beacon frames. Therefore, the tag device should be capable of operating without a short address assignment.

The DAMC protocol beacon payload 313 is delineated into a number of fields for providing information, instructions, and data to facilitate network management and utilization of tag devices. Tag and reader devices are defined to parse and understand the DAMC protocol beacon payload as conveyed through the beacon frame. It should be understood that the DAMC protocol beacon payload 313 is defined outside of the 802.15.4 protocol.

The DAMC protocol beacon payload structure 313 includes the following fields:

Device Type Field 317
Beacon Type Field 319
Alternate Channel Field 321
Beacon Interval Field 323
Association Timeout Field 325
Response Interval Field 327
Data Length Field 329
Data Field 331
CRC (cyclic redundancy check) Field 333.

The Device Type Field 317 includes data that identifies a device type of the beacon frame sending device. FIG. 3C shows a chart of Device Type Field 317 data values for different types of sending devices, in accordance with one embodiment of the present invention. In one embodiment, tag devices can be operated to log interactions with specific device types. Also, the available Device Type Field 317 data values and corresponding device type categories within the DAMC protocol, as shown in FIG. 3C, allow for extension and interoperability of the DAMC protocol with other device types or network types.

The Beacon Type Field 319 includes data that identifies which type of beacon is represented in the beacon frame transmission. In one embodiment, there can be up to 255 different types of beacons. Based on beacon type specification in the Beacon Type Field 319, the tag device will be informed as to how the DAMC protocol beacon payload data (Data Field 331) should be decoded. In one embodiment, the most significant bit (MSB) of the Beacon Type Field 319 is used to identify the type of beacon and how to decode the data in the Data Field 331. FIG. 3D shows a chart of MSB setting within the Beacon Type Field 319 and its corresponding meaning, in accordance with one embodiment of the present invention.

As shown in FIG. 3D, if the MSB is 0x00, then the Data Field 331 is to be considered empty. If the MSB is 0x80, then the remaining 7 bits of the Beacon Type Field 319 are to be interpreted as a bitmask indicating what types of data are present in the Data Field 331, and correspondingly, how the data in the Data Field 331 is to be parsed and processed by the tag device. FIG. 3E shows a chart of bitmask values used in the Beacon Type Field 319 and their corresponding data types to be considered present in the Data Field 331, in accordance with one embodiment of the present invention.

Figure 7:
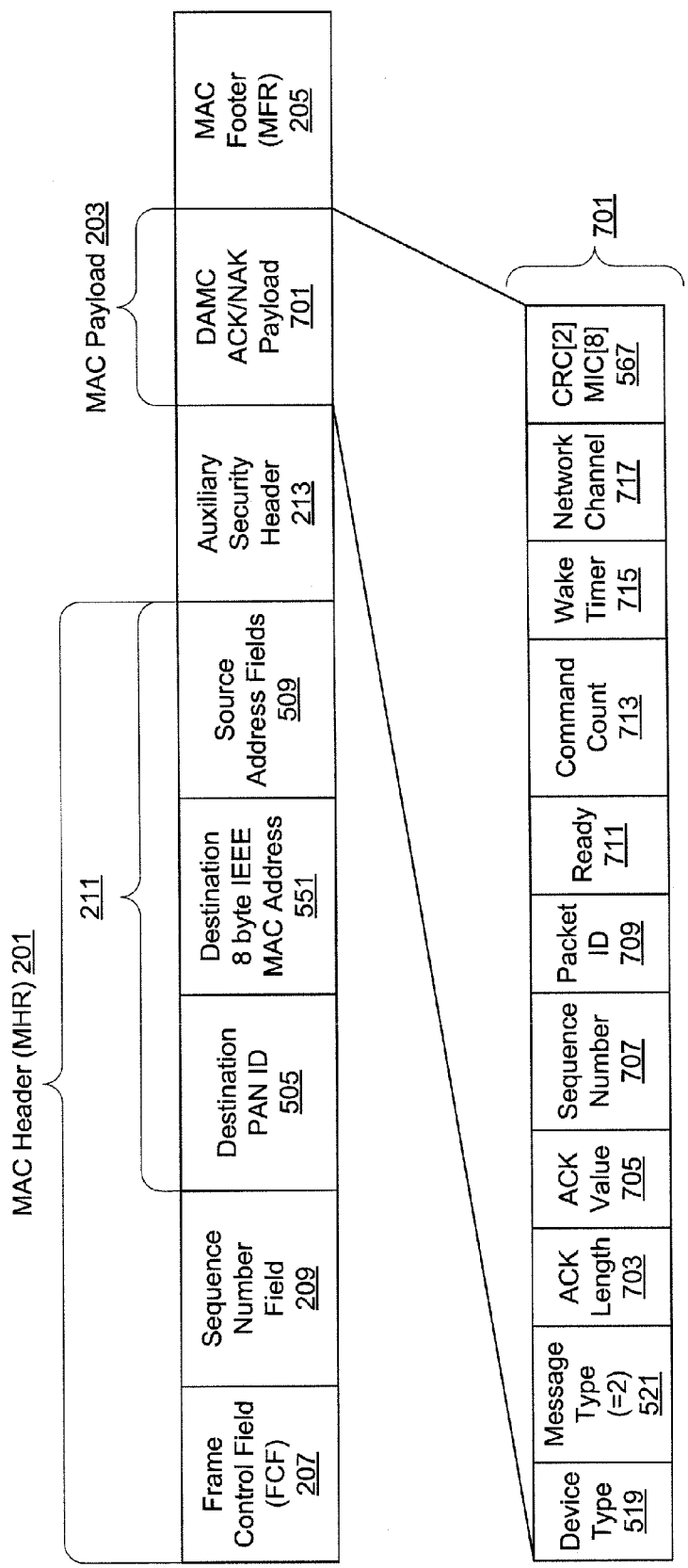
FIG. 7 shows an acknowledgement (ACK/NAK) frame structure of the DAMC protocol, in accordance with one embodiment of the present invention.

FIG. 3F shows a Beacon Type Field 319 bitmask example, in accordance with one embodiment of the present invention. In this example, the Beacon Type Field 319 includes the value 0x83. The MSB value 0x80 indicates that the 7 other bits in the Beacon Type Field 319 are to be interpreted as a bitmask. So, the bitmask includes bit values 0x01 and 0x02 in bitmask order, which indicates that the Data Field 331 includes reader date and time (corresponding to bit value 0x01) and reader identification (corresponding to bit value 0x02), in bitmask order. In the embodiment of FIG. 3F, 7 bytes are used to specify the reader date and time data, and 20 bytes are used to specify the reader identification data.

With reference back to FIG. 3B, the Alternate Channel Field 321 is used to identify an alternate radio channel that should be used by the tag device for network association. In one embodiment, the Alternate Channel Field 321 is 1 byte in size. In this embodiment, the MSB of the Alternate Channel Field 321 is used to indicate whether or not use of the alternate channel by the tag device is mandatory, e.g., with 0 indicating non-mandatory and 1 indicating mandatory. If the specified alternate channel is different from the current channel over which the beacon frame is received, the tag device is defined to use the specified alternate channel for transmitting its network association request and subsequent data transmissions to the reader device. In one embodiment, possible alternate channel values include 11 through 26. It should be appreciated that the availability of the alternate channel specification in the Alternate Channel Field 321 provides for direction of the tag device to transmit more lengthy data communications on non-hailing channels, thereby freeing up the hailing channels to enable contact with more tag devices within range of the beacon transmitting reader device.

The Beacon Interval Field 323 is used to specify an integer value in seconds of the dwell time of the DAMC protocol, i.e., the time between each beacon period. In one embodiment, the Beacon Interval Field 323 is 1 byte in size. A Beacon Interval Field 323 value of 0 indicates that beacon frames are transmitted continuously with no dwell time. A Beacon Interval Field 323 value of 1 to 255 indicates that the dwell time is defined by that number of seconds. For example, a Beacon Interval Field 323 value of 60 indicates a dwell time of 60 seconds. In one embodiment, a dwell time for a long-range reader device (800 to 1,000 meter range) is 60 seconds. Also, in one embodiment, a dwell time for short-range reader device (50 to 100 meters) is 15 seconds. However, it should be understood that the dwell times in the above-mentioned embodiments are provided as examples only. The dwell time can be set to any suitable value between 1 and 255 seconds, depending on the particular network conditions.

The Association Timeout Field 325 is used to specify an integer value of beacon intervals, as specified in the Beacon Interval Field 323, that must be missed by the tag device in order for the tag device to disassociate from the beacon network. By disassociating from a beacon network when no longer within range of the beacon network, the tag device is freed to change modes of operation to something more appropriate. In one embodiment, the Association Timeout Field 325 is 1 byte in size. An Association Timeout Field 325 value of 0 indicates that the tag device should never timeout, i.e., disassociate, from the beacon network. An Association Timeout Field 325 value of 1 to 255 is a multiplier on the dwell time to establish the timeout period. For example, an Association Timeout Field 325 value of 10, with a Beacon Interval Field 323 value of 60, indicates that the tag device should disassociate from the beacon network if it does not receive a beacon within 600 consecutive seconds (10*60 seconds). In one embodiment, an Association Timeout Field 325 value of 10 is used for long-range reader devices. Also, in one embodiment, an Association Timeout Field 325 value of 4 is used for short-range reader devices. However, it should be understood that the Association Timeout Field 325 values in the above-mentioned embodiments are provided as examples only. The Association Timeout Field 325 values can be set to any suitable value between 1 and 255, depending on the particular network conditions.

The Response Interval Field 327 is used to specify an integer value of beacon intervals, as specified in the Beacon Interval Field 323, that a tag device can go before it must communicate its status to the reader device in order to remain connected to the network. The Response Interval Field 327 value allows the tag device to reduce power consumption by responding with tag device status data at a network specified interval. Also, the Response Interval Field 327 value serves to randomize and distribute data traffic on the network based on timing of network association with tag devices. In one embodiment, the Response Interval Field 327 is 1 byte in size. A Response Interval Field 327 value of 0 indicates that the tag device should never respond to the reader device without first being requested/instructed to respond by the reader device. A Response Interval Field 327 value of 1 to 255 is a multiplier on the dwell time to establish the unsolicited response interval for the tag device. For example, a Response Interval Field 327 value of 30, with a Beacon Interval Field 323 value of 60, indicates that the tag device should provide its unsolicited status to the reader device within 1800 seconds (30*60 seconds) of providing its most recent status communication.

The Data Length Field 329 specifies the length in bytes of both the data included in the Data Field 331 and the data included in the CRC Field 333. The Data Field 331 includes the data corresponding to the data type indication provided within the Beacon Type Field 319. Examples of various types of Data Field 331 data are shown in FIG. 3E, in accordance with one embodiment of the present invention. The CRC Field 333 includes the CRC data values associated with the data of the DAMC protocol beacon payload 313. In one embodiment, the CRC data is computed according to an industry standard CRC specification, such as CRC CCITT (0xffff). It should be appreciated that the use of CRC data specific to the DAMC protocol beacon payload 313, serves to strengthen the 802.15.4 error detection associated with the beacon frame, i.e., the MFR 205.

DAMC Broadcast Frame

Figure 4A:
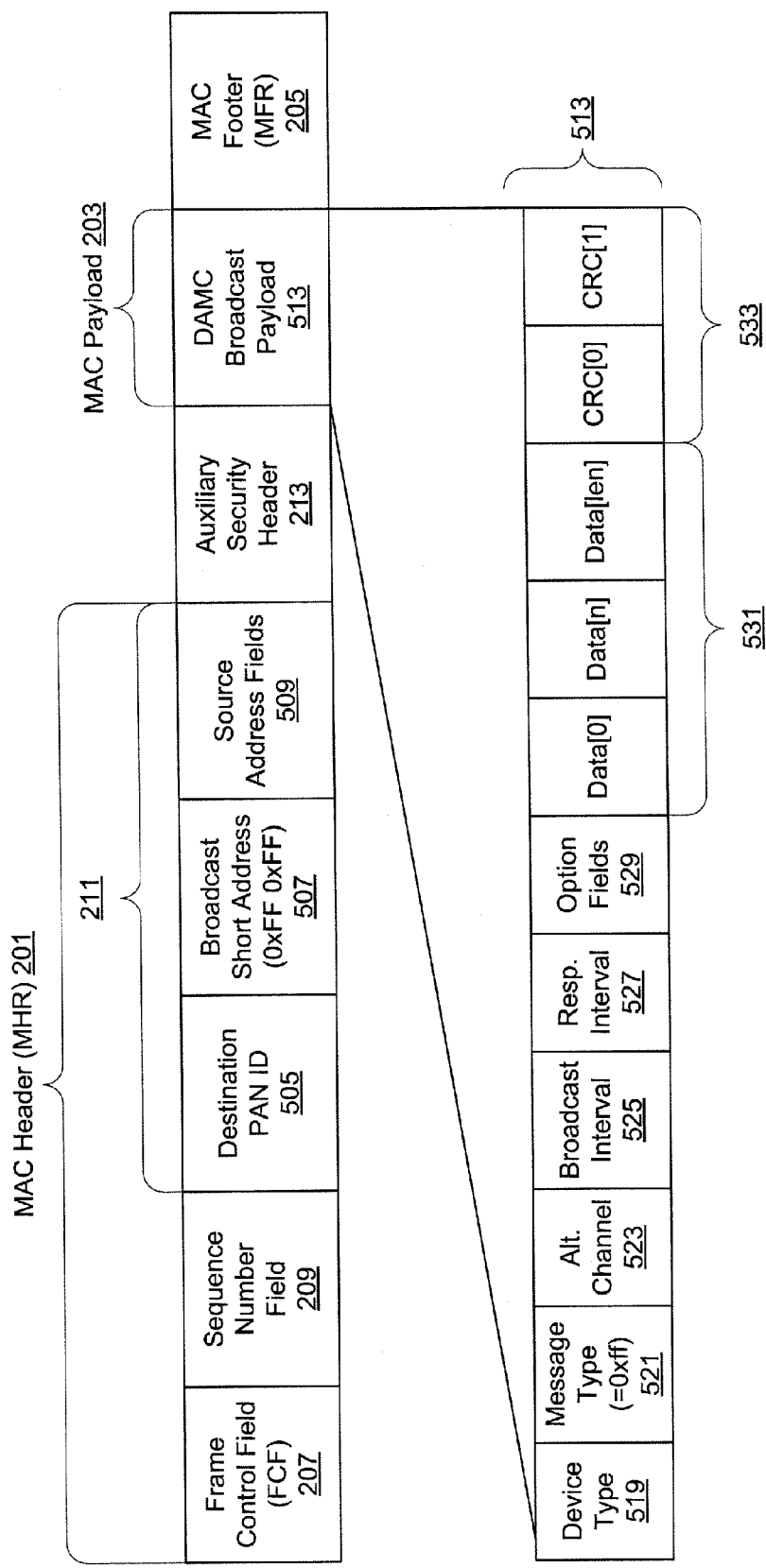
FIG. 4A shows a broadcast network discovery (BND) frame structure of the DAMC protocol, in accordance with one embodiment of the present invention.

FIG. 4A shows a broadcast network discovery (BND) frame structure of the DAMC protocol, in accordance with one embodiment of the present invention. The DAMC protocol BND frame structure includes the following fields:
    FCF 207
    Sequence Number Field 209
    Address Fields 211, including:
        Destination PAN ID (personal area network identifier) 505
        Broadcast Short Address (0xFF 0xFF) 507
        Source Address Fields 509
    Auxiliary Security Header Field 213
    MAC payload portion 203, including:
        DAMC Protocol Broadcast Payload 513
    MFR 205, including FCS.

The FCF 207, sequence number field 209, address fields 211, auxiliary security header field 213, and MFR 205 are from the MAC frame structure, as discussed above. The address fields 211 includes the destination PAN ID field 505, the broadcast short address field 507, and the source address fields 509. The destination PAD ID field 505 is used to specify the unique PAN identifier of the intended recipient of the BND frame. The broadcast short address field 507 is used to specify a shortened address of the destination device. The source address fields 509 are used to specify the identifier of the PAN of the frame's originator and/or the identifier of the frame originator. The MAC payload portion 203 of the BND frame includes data and formatting that is specific to the DAMC protocol. Specifically, the MAC payload portion 203 of the BND frame includes a DAMC protocol broadcast payload 513 that is defined in accordance with the DAMC protocol.

The broadcast payload 513 is defined in accordance with the DAMC protocol, and is delineated into a number of fields for providing information, instructions, and data to facilitate network management and utilization of tag devices. The tag and reader devices are defined to parse and understand the DAMC protocol broadcast payload as conveyed through the BND frame. The DAMC protocol broadcast payload structure 513 includes the following fields:
    Device Type Field 519
    Message Type (0xff) Field 521
    Alternate Channel Field 523
    Broadcast Interval Field 525
    Response Interval Field 527
    Option Field 529
    Data Field 531
    CRC (cyclic redundancy check) Field 533.

The Device Type Field 519 includes data that identifies a device type of the broadcast packet sending device. The device type data values shown in FIG. 3C for different types of sending devices within the beacon network are equally applicable to different types of sending devices within the broadcast network. In one embodiment, tag devices can be operated to log interactions with specific device types. Also, the available Device Type Field 519 data values and corresponding device type categories within the DAMC protocol, as shown in FIG. 3C, allow for extension and interoperability of the DAMC protocol with other device types or network types.

The Message Type Field 521 identifies to the tag device what type of message, i.e., what type of data, is included within the broadcast packet. FIG. 4B shows a chart of Message Type Field 521 values and their corresponding data descriptions, in accordance with one embodiment of the present invention. In the embodiment of FIG. 4B, the broadcast packet can convey command data, general data, acknowledgment status (ACK or NAK), among other types of data. Also, the broadcast packet can be used for broadcast network discovery by specifying the value 0xFF in the Message Type Field 521.

The Alternate Channel Field 523 is used to identify an alternate radio channel that should be used by the tag device for network association. In one embodiment, the Alternate Channel Field 523 is 1 byte in size. In this embodiment, the MSB of the Alternate Channel Field 523 is used to indicate whether or not use of the alternate channel by the tag device is mandatory, e.g., with 0 indicating non-mandatory and 1 indicating mandatory. If the specified alternate channel is different from the current channel over which the broadcast packet is received, the tag device is defined to use the specified alternate channel for transmitting its network association request and subsequent data transmissions to the reader device. In one embodiment, possible alternate channel values include 11 through 26. It should be appreciated that the availability of the alternate channel specification in the Alternate Channel Field 523 provides for direction of the tag device to transmit more lengthy data communications on non-hailing channels, thereby freeing up the hailing channels to enable contact with more tag devices within range of the broadcast transmitting reader device.

The Broadcast Interval Field 525 is used to specify an integer value in seconds of the dwell time of the DAMC protocol, i.e., the time between each broadcast period. In one embodiment, the Broadcast Interval Field 525 is 1 byte in size. A Broadcast Interval Field 525 value of 0 indicates that broadcast packets are transmitted continuously with no dwell time. A Broadcast Interval Field 525 value of 1 to 255 indicates that the dwell time is defined by that number of seconds. For example, a Broadcast Interval Field 525 value of 60 indicates a dwell time of 60 seconds. In one embodiment, a dwell time for a long-range reader device (800 to 1,000 meter range) is 60 seconds. Also, in one embodiment, a dwell time for short-range reader device (50 to 100 meters) is 15 seconds. However, it should be understood that the dwell times in the above-mentioned embodiments are provided as examples only. The dwell time can be set to any suitable value between 1 and 255 seconds, depending on the particular network conditions.

The Response Interval Field 527 is used to specify an integer value of broadcast intervals, as specified in the Broadcast Interval Field 525, that a tag device can go before it must communicate its status to the reader device in order to remain connected to the network. The Response Interval Field 527 value allows the tag device to reduce power consumption by responding with tag device status data at a network specified interval. Also, the Response Interval Field 527 value serves to randomize and distribute data traffic on the network based on timing of network association with tag devices. In one embodiment, the Response Interval Field 527 is 1 byte in size. A Response interval Field 527 value of 0 indicates that the tag device should never respond to the reader device without first being requested/instructed to respond by the reader device. A Response Interval Field 527 value of 1 to 255 is a multiplier on the dwell time to establish the unsolicited response interval for the tag device. For example, a Response Interval Field 527 value of 30, with a Broadcast Interval Field 525 value of 60, indicates that the tag device should provide its unsolicited status to the reader device within 1800 seconds (30*60 seconds) of providing its most recent status communication.

The Option Field 529 includes a data value that identifies the types of optional data fields present in the Data Field 531 of the BND frame transmission. In one embodiment, there can be up to 255 different types of option data fields in the Data Field 531. Based on data type specification in the Option Field 529, the tag device will be informed as to how the DAMC protocol broadcast payload data (Data Field 531) should be decoded. In one embodiment, the most significant bit (MSB) of the Option Field 529 is used to identify the type of data and how to decode the data in the Data Field 531. Similar to the beacon method, FIG. 3D shows a chart of MSB setting within the Option Field 529 and its corresponding meaning, in accordance with one embodiment of the present invention.

As shown in FIG. 3D, if the MSB is 0x00, then the Data Field 531 is to be considered empty. If the MSB is 0x80, then the remaining 7 bits of the Option Field 529 are to be interpreted as a bitmask indicating what types of data are present in the Data Field 531, and correspondingly, how the data in the Data Field 531 is to be parsed and processed by the tag device. Similar to the beacon method, FIG. 3E shows a chart of bitmask values used in the Option Field 529 and their corresponding data types to be considered present in the Data Field 531, in accordance with one embodiment of the present invention.

The Data Field 531 includes the data corresponding to the data type indication provided within the Option Field 319. As with the beacon method, examples of various types of Data Field 531 data that can be transmitted in the broadcast method are shown in FIG. 3E, in accordance with one embodiment of the present invention. The CRC Field 533 includes the CRC data values associated with the data of the DAMC protocol broadcast payload 513. In one embodiment, the CRC data is computed according to an industry standard CRC specification, such as CRC CCITT (0xffff). It should be appreciated that the use of CRC data specific to the DAMC protocol broadcast payload 513 serves to strengthen the 802.15.4 error detection associated with the MAC frame.

Once a tag device discovers a broadcast network through receipt and processing of the BND frame, the tag device can receive a number of additional type of communications through the broadcast network. These additional type of communications include commands, data, and acknowledgements, among others. These additional types of communications are transmitted through the beacon network in DAMC protocol command frames, DAMC protocol data frames, and DAMC protocol acknowledgment frames, respectively.

DAMC Protocol Command Frame

Figure 5:
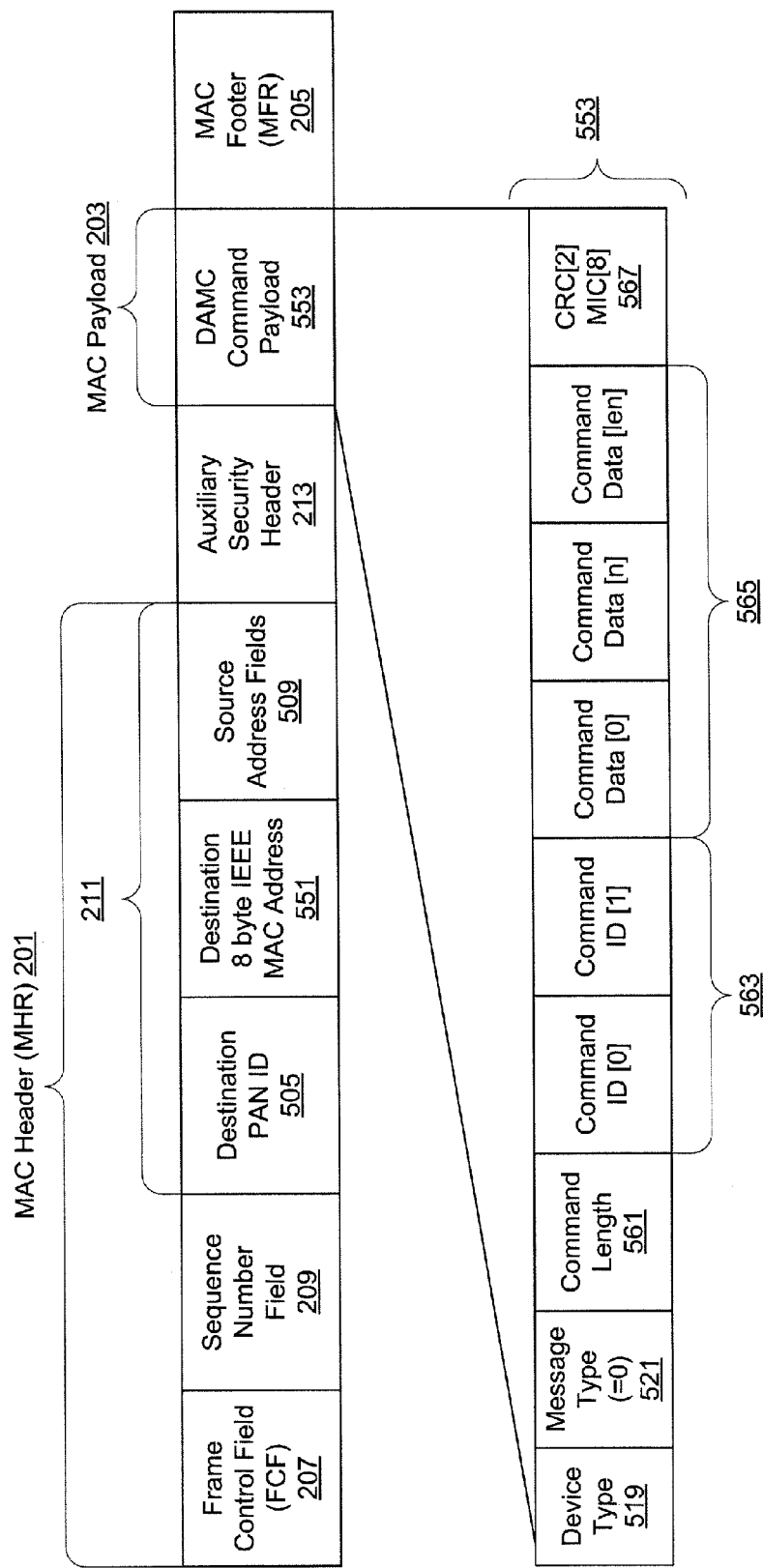
FIG. 5 shows a command frame structure of the DAMC protocol, in accordance with one embodiment of the present invention.

FIG. 5 shows a command frame structure of the DAMC protocol, in accordance with one embodiment of the present invention. The DAMC protocol command frame structure includes the following fields:
  FCF 207
  Sequence Number Field 209
  Address Fields 211, including:
    Destination PAN ID (personal area network identifier) 505
    Destination 8 byte IEEE MAC Address Field 551
    Source Address Fields 509
  Auxiliary Security Header Field 213
  MAC payload portion 203, including:
    DAMC Command Payload 553
  MFR 205, including FCS.

The FCF 207, sequence number field 209, auxiliary security header field 213, and MFR 205 are the same as discussed above with regard to the MAC frame structure. The MAC payload portion 203 includes data and formatting that is specific to the DAMC protocol. Specifically, the MAC payload portion 203 includes a DAMC protocol command payload 553 that is defined in accordance with the DAMC protocol.

The DAMC protocol command payload 553 is delineated into a number of fields for providing information, instructions, and data to facilitate network management and utilization of tag devices. Tag and reader devices are defined to parse and understand the DAMC protocol command payload 553 as conveyed through the MAC frame.

The DAMC protocol command payload 553 structure includes the following fields:
 Device Type Field 519
 Message Type Field 521 (Set equal to 0)
 Command Length Field 561
 Command Identifier (ID) Field 563 (2 bytes)
 Command Data Field 565
 CRC/MIC (message integrity code) Field 567.

The device type field 519 identifies the type of device that is sending the DAMC protocol command. The message type field 521 is set equal to 0 to indicate that the MAC frame is a command frame. The command length field 561 specifies how long, i.e., how many bytes, the command data is in the present command frame. The command ID field 563 specifies a type of command conveyed by the present command frame. In one embodiment, there are 65536 different possible command identifiers. The command data field 565 includes the data for the commands identified in the command ID field 563. The CRC/MIC field 567 includes CRC data if encryption is not enabled, and includes an 8 byte MIC if encryption is enabled.

In one embodiment, through the DAMC protocol command frame, a reader device can command an associated remote asset, i.e., tag device, as in a peer-to-peer network topology. In this embodiment, the broadcast short address (0xFF 0xFF) 507 in the BND frame is replaced with the long address of the targeted remote asset, i.e., targeted tag device, in the destination 8 byte IEEE MAC address field 551. The broadcast network discovery can issue a single command or it can indicate that the remote asset tag device should remain active for a specified amount of time. The remote tag device can stay active for some amount of time to complete commanding operations with the reader device. In some instances, the remote asset tag device can emporarily switch to an alternate radio channel indicated in the BND frame.

DAMC Protocol Data Frame

Figure 6:
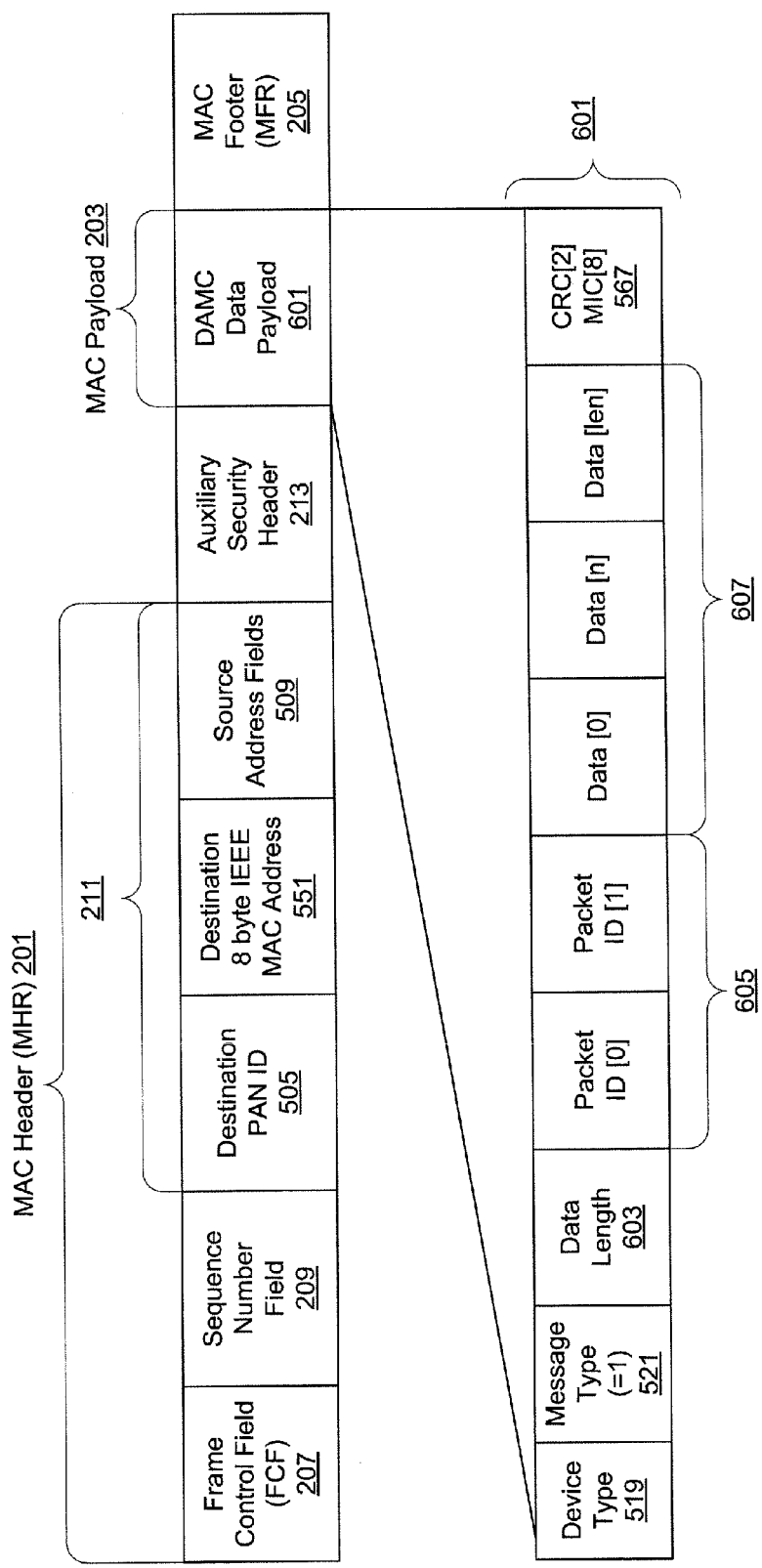
FIG. 6 shows a data frame structure of the DAMC protocol, in accordance with one embodiment of the present invention.

FIG. 6 shows a data frame structure of the DAMC protocol, in accordance with one embodiment of the present invention. The DAMC protocol data frame structure includes the following fields:
 FCF 207
 Sequence Number Field 209
 Address Fields 211, including:
  Destination PAN ID (personal area network identifier) 505
  Destination 8 byte IEEE MAC Address Field 551
  Source Address Fields 509
 Auxiliary Security Header Field 213
 MAC payload portion 203, including:
  DAMC Protocol Data Payload 601
 MFR 205, including FCS.

The FCF 207, sequence number field 209, auxiliary security header field 213, and MFR 205 are the same as discussed above with regard to the MAC frame structure. The destination PAN ID field 505, destination 8 byte IEEE MAC address field 551, and source address fields 509 are the same as those described above with regard to the DAMC protocol command frame of FIG. 5. The MAC payload portion 203 includes data and formatting that is specific to the DAMC protocol. Specifically, the MAC payload portion 203 includes a DAMC protocol data payload 601 that is defined in accordance with the DAMC protocol.

The DAMC protocol data payload 601 is delineated into a number of fields for providing information, instructions, and data to facilitate network management and utilization of tag devices. Tag and reader devices are defined to parse and understand the DAMC protocol data payload 601 as conveyed through the MAC frame.

The DAMC protocol data payload 601 structure includes the following fields:
 Device Type Field 519
 Message Type Field 521 (Set equal to 1)
 Data Length Field 603
 Packet Identifier (ID) Field 605 (2 bytes)
 Data Field 607
 CRC/MIC Field 567.

The device type field 519 identifies the type of device that is sending the DAMC protocol data. The message type field 521 is set equal to 1 to indicate that the MAC frame is a DAMC protocol data frame. The data length field 603 specifies how many bytes the data includes in the present data frame. The packet ID field 605 includes 2 bytes. The MSB of the first byte of the packet ID field 605 is reserved to specify whether or not the included data is stored data, i.e., non-real-time data. In one embodiment, an MSB value of 1 specifies stored data, and an MSB of 0 specifies real-time data. With the 2 bytes of the packet ID field 605, there can be up to 32768 different packet identifiers defined. The data field 607 includes the data corresponding to the packet ID field 605. The CRC/MIC field 567 includes CRC data if encryption is not enabled, and includes an 8 byte MIC if encryption is enabled. In one embodiment, commercial proprietary data conveyed through the DAMC protocol data frame may be protected with encryption, and this protection may be done on a per trip basis.

The DAMC protocol data frame can be used to convey any of the following types of data, among others:
 Health and status data of remote assets as monitored through tag device
 Tracking and GPS data, if tag device equipped with GPS receiver
 Engineering data of tag device (battery status, timers, etc.)
 Parameters and commissioning data of tag device for trips
 Logged reader data, including locations and reader names
 Time tagged stored data and real-time data during "transit reads" of tag device DAMC Protocol Acknowledgement Frame FIG. 7 shows an acknowledgement (ACK/NAK) frame structure of the DAMC protocol, in accordance with one embodiment of the present invention. The term ACK refers to an acknowledgement without errors. The term NAK refers to an acknowledgement with errors. The DAMC protocol ACK/NAK frame structure includes the following fields:
 FCF 207
 Sequence Number Field 209
 Address Fields 211, including:
  Destination PAN ID (personal area network identifier) 505
  Destination 8 byte IEEE MAC Address Field 551
  Source Address Fields 509
 Auxiliary Security Header Field 213
 MAC payload portion 203, including:
  DAMC Protocol ACK/NAK Payload 701
 MFR 205, including FCS.

The FCF 207, sequence number field 209, auxiliary security header field 213, and MFR 205 are the same as discussed above with regard to the MAC frame structure. The destination PAN ID field 505, destination 8 byte IEEE MAC address field 551, and source address fields 509 are the same as those described above with regard to the DAMC protocol command frame of FIG. 5. The MAC payload portion 203 includes data and formatting that is specific to the DAMC protocol. Specifically, the MAC payload portion 203 includes a DAMC protocol ACK/NAK payload 701 that is defined in accordance with the DAMC protocol.

The DAMC protocol ACK/NAK payload 701 is delineated into a number of fields for providing information, instructions, and data to facilitate network management and utilization of tag devices. Tag and reader devices are defined to parse and understand the DAMC protocol ACK/NAK payload 701 as conveyed through the MAC frame.

The DAMC protocol ACK/NAK payload 701 structure includes the following fields:
  Device Type Field 519
  Message Type Field 521 (Set equal to 2)
  ACK Length Field 703
  ACK Value Field 705
  Sequence Number Field 707
  Packet ID Field 709
  Ready Field 711
  Command Count Field 713
  Wake Timer Field 715
  Network Channel Field 717
  CRC/MIC Field 567.

The device type field 519 identifies the type of device that is sending the DAMC protocol ACK/NAK frame. The message type field 521 is set equal to 2 to indicate that the MAC frame is a DAMC protocol ACK/NAK frame. The ACK length field 703 specifies the length in bytes of the ACK/NAK frame payload 701. The ACK value field 705 specifies whether or not the ACK/NAK frame represents an ACK (successful acknowledgement) or NAK (unsuccessful acknowledgement). In one embodiment, an ACK value field 705 value of 0x02 identifies an ACK, and an ACK value field 705 value of 0x00 identifies a NAK.

The sequence number field 707 specifies the sequence number of the received frame that is being acknowledged. The sequence number of the received frame is transmitted in the sequence number field 209 of the received frame. The packet ID field 709 specifies the identifier of the packet that is being acknowledged, when the ACK value field 705 specifies an ACK. The packet ID field 709 specifies the error type, when the ACK value field 705 specifies a NAK. The ready field 711 specifies whether or not the acknowledging device is ready to receive more data. In one embodiment, a value of 0 in the ready field 711 specifies that the acknowledging device is ready to receive more data. Any value other than 0 in the ready field 711 specifies a number of seconds of delay requested by the acknowledging device before receiving more data.

The command count field 713 specifies a value of an incrementing counter that indicates a sequence number of processed commands. The wake timer field 715 specifies a value of a sleep timer that the sending device is using. The network channel field 717 specifies a current network channel that the sending device is utilizing for data transfers. The CRC/MIC field 567 includes CRC data if encryption is not enabled, and includes an 8 byte MIC if encryption is enabled. Also, the DAMC protocol ACK/NAK frame can be encrypted to improve security.

As discussed above, in addition to acknowledging receipt of network communication frames, the DAMC protocol ACK/NAK frame can be used to convey command count, sleep parameters, active network channel, and flow control information. Also, in the event of a NAK, the DAMC protocol ACK/NAK protocol frame can be used to return error conditions to the sender in the event of a failed transmission. For example, the error conditions may include CRC error, encryption error, command error, among others. The sending device can be defined to respond to the identified error condition in prescribed manner. For example, in response to a CRC error identification, the sending device can be defined to immediately resend the failed transmission. In response to an encryption error identification, the sending device can be defined to halt resending of the failed transmission. In response to a command error identification, the sending device can be defined to consider that the target device is out of range or there is missing command data, and halt resending of the failed transmission.

DAMC Protocol Encryption

In the DAMC protocol, packet encryption for link level communication is optional. Also, networks can operate using the DAMC protocol in both unencrypted and encrypted modes simultaneously to enable protection of commercial proprietary data. If a DAMC protocol frame (beacon, BND, command, data, or acknowledgement) is encrypted, the encryption bit in the frame control field (FCF) 207 is set to indicate encryption. Encrypted DAMC protocol frames include a 5 byte nonce at the start of the MAC payload 203. The nonce format is defined per IEEE 802.15.4. With the DAMC protocol, encryption keys can be implicit or explicit (802.15.4 key mode can be 0, 1, 2, or 3). It should be understood that encryption key management is performed during the network association process.

The straight IEEE 802.15.4 encryption methods include some weaknesses. For example, under 802.15.4, ACK/NAK frames are neither addressed nor encrypted. This leaves the standard 802.15.4 communication open to "man in the middle" attacks that can inhibit communication delivery retries. Also, under 802.15.4, a noise burst followed by a forged ACK can be used to maliciously cancel a message. Additionally, 802.15.4 integrated circuits support limited space for access control list. As a result, multiple encryption methods and keys require API management. Also, having to use a separate nonce for each node presents a risk during power down. And, the loss of access control list state during power down can result in the drop of the network. Further, because straight 802.15.4 encryption uses a "blind" nonce, it is possible for the nonce sequence to be lost during power down.

Also, when utilizing the advanced encryption standard (AES) in counter (CTR) mode under 802.15.4, a denial of service can be caused by an entity maliciously forging a packet with a maximum nonce counter. With the AES CTR mode of encryption, the network is highly vulnerable to being disabled due to the lack of the MAC inserted within the 802.15.4 packet. Also, with the AES CTR mode of encryption, when copying packets with new addresses, authentication codes must include the addresses. Additionally, when utilizing AES in cipher block chaining (CBC) mode under 802.15.4, the network communication is vulnerable to replay attacks due to the absence of counter mode protection.

The DAMC protocol provides improvements to address the above-mentioned weaknesses of the straight 802.15.4 encryption methods. Specifically, the DAMC protocol provides for encryption and authentication of acknowledgements (ACK's), which provides for elimination of forged acknowledgments. Also, in the DAMC protocol, ACK's are managed at the application level. Therefore, devices that are 802.15.4 compliant can continue to operate under the DAMC protocol. Additionally, the DAMC protocol provides for utilization of AES-CCM-MAC-64 mode of encryption. This mode of encryption satisfies minimum requirements, addresses replay attacks and authentication, and provides a strong message authentication code with less overhead. Further, the DAMC protocol allows the nonce to be transmitted in the clear. This serves to minimize the risk of network shutdown due to synchronization errors.

Exemplary Embodiments

Figure 8:
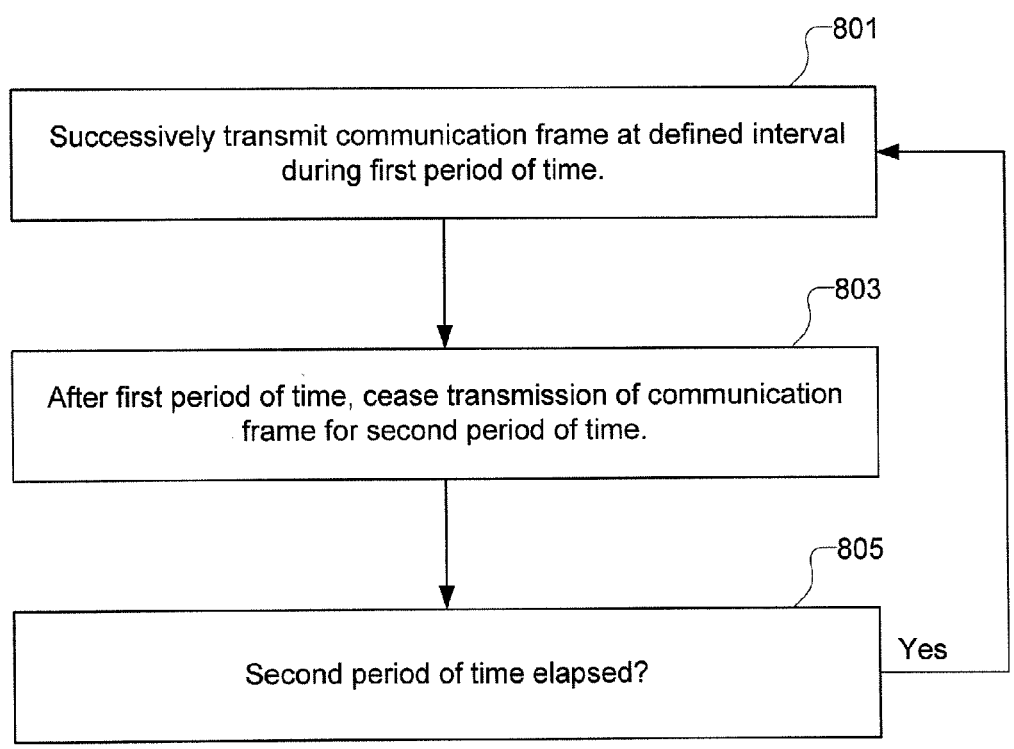
FIG. 8 shows a flowchart of a method for wireless network operation, in accordance with one embodiment of the present invention.

FIG. 8 shows a flowchart of a method for wireless network operation, in accordance with one embodiment of the present invention. The method includes an operation 801 in which a communication frame is successively transmitted at a defined interval during a first period of time. The first period of time can refer to either the beacon period or the broadcast period as previously discussed. The method also includes an operation 803 in which, after the first period of time, transmission of the communication frame is ceased for a second period of time. The second period of time can refer to the dwell time as previously discussed with regard to the beacon and broadcast methods of network discovery. The method further includes an operation 805 in which, after the second period of time, the method reverts back to operation 801.

In one embodiment, the defined interval between successive communication frame transmissions is set within a range extending from 6 milliseconds to 19 milliseconds. Also, in one embodiment, the first period of time has a duration of 1 second. Also, in one embodiment, the second period of time has a duration within a range extending from 1 second to 255 seconds.

In one embodiment, the communication frame in the method of FIG. 8 is a medium access control (MAC) frame of an IEEE 802.15.4 communication protocol. In one embodiment, the MAC frame is formatted as a beacon frame, and the beacon frame includes a payload portion that is formatted in accordance with a distributed access management (DAMC) protocol separate from the IEEE 802.15.4 communication protocol. In another embodiment, the MAC frame is formatted as a broadcast network discovery (BND) frame, and the BND frame includes a payload portion that is formatted in accordance with a distributed access management (DAMC) protocol separate from the TREE 802.15.4 communication protocol.

The method of FIG. 8 can include operating a network device to receive and process the communication frame. Also, the method can include operating the network device to respond to the communication frame by sending a request to join a network to a device from which the communication frame was transmitted. The device from which the communication frame was transmitted can be operated to either allow the network device to join the network or to deny the network device from joining the network.

Figure 9:
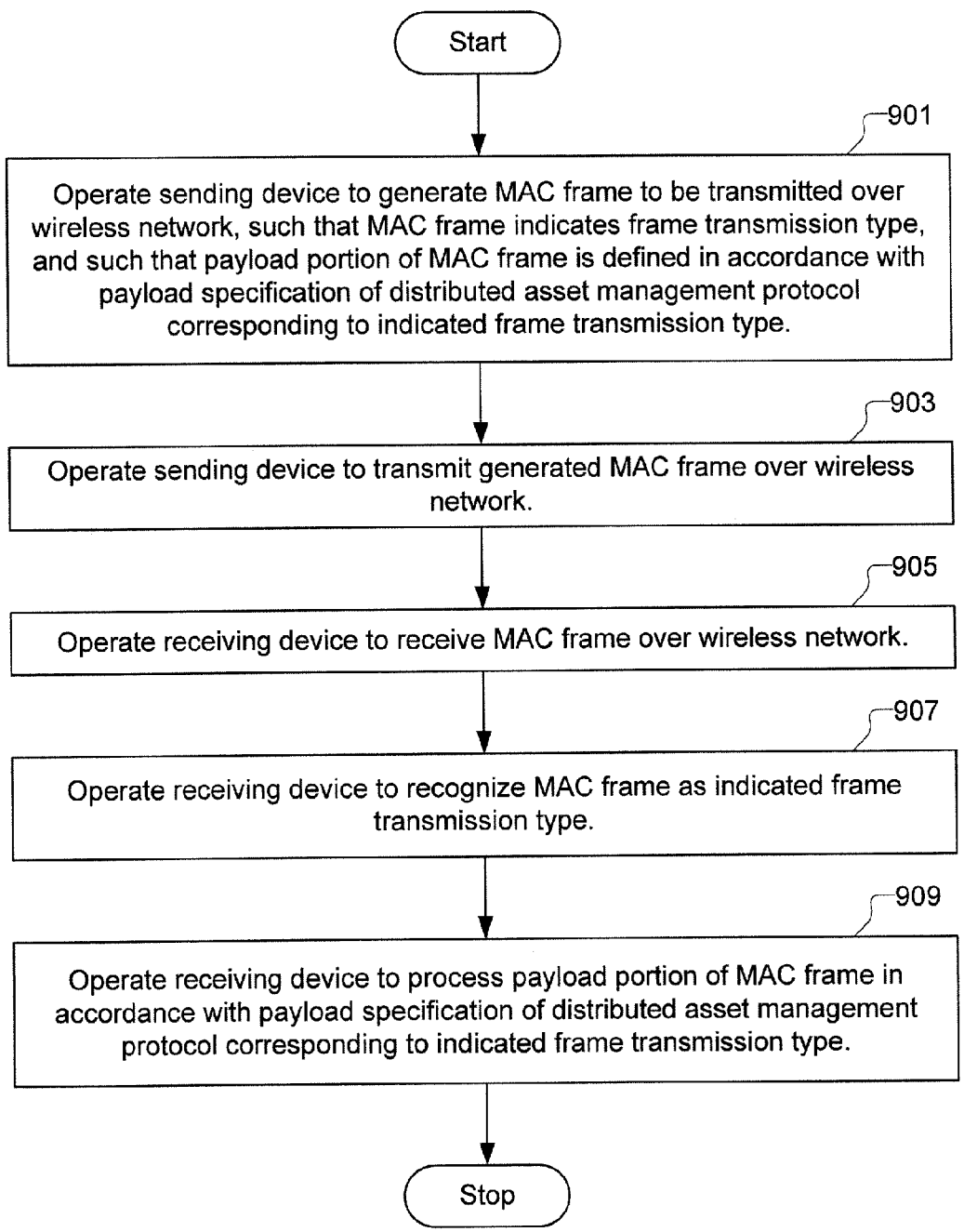
FIG. 9 shows a flowchart of a method for communicating data over a wireless network in accordance with the distributed asset management (DAMC) protocol, in accordance with one embodiment of the present invention.

FIG. 9 shows a flowchart of a method for communicating data over a wireless network in accordance with the distributed asset management (DAMC) protocol, in accordance with one embodiment of the present invention. The method includes an operation 901 for operating a sending device to generate a MAC frame to be transmitted over the wireless network. Generating the MAC frame in operation 901 includes setting a frame control field of the MAC frame to indicate a frame transmission type. In one embodiment, the frame transmission type is one of a beacon frame, a broadcast network discovery frame, a data frame, a command frame, and an acknowledgement frame. Also, generating the MAC frame in operation 901 includes defining a payload portion of the MAC frame in accordance with a payload specification of the distributed asset management (DAMC) protocol corresponding to the indicated frame transmission type.

The method also includes an operation 903 in which the sending device is operated to transmit the generated MAC frame over the wireless network. In an operation 905, a receiving device is operated to receive the MAC frame over the wireless network. Then, in an operation 907, the receiving device is operated to recognize the MAC frame as the indicated frame transmission type. The method further includes an operation 909 in which the receiving device is operated to process the payload portion of the MAC frame in accordance with the payload specification of the distributed asset management (DAMC) protocol corresponding to the indicated frame transmission type.

In the method of FIG. 9, each of the sending and receiving devices is compliant with both an IEEE 802.15.4 standard and the distributed asset management (DAMC) protocol. Non-payload portions of the MAC frame are defined to be processed by wireless communication devices that are compliant with the IEEE 802.15.4 standard. And, payload portions of the MAC frame are defined to be processed by wireless communication devices that are compliant with the distributed asset management (DAMC) protocol.

In one embodiment, the frame transmission type in the method of FIG. 9 is a beacon frame. In this embodiment, the payload specification of the distributed asset management (DAMC) protocol corresponding to the beacon frame includes:
  an identification of a device type of the sending device,
  an identification of a type of data included within a data portion of the payload of the beacon frame,
  an identification of an alternate channel to be used for subsequent communication,
  a specification of a beacon interval duration of the sending device,
  a specification of an association timeout duration for the receiving device,
  a specification of a response interval duration for the receiving device,
  a specification of a length of data included within the data portion of the payload of the beacon frame,
  the data portion of the payload of the beacon frame, and
  a specification of cyclic redundancy data associated with the payload of the beacon frame.

In one embodiment, the type of data included within the data portion of the payload of the beacon frame includes one or more of device date and time, device identification, device location, device velocity, and device differential global positioning system correction. Also, in one embodiment, the beacon interval duration of the sending device is an integer value in seconds between successive beacon periods. In this embodiment, each beacon period is a duration of time during which MAC frames of the beacon frame type are successively transmitted at a set interval. In one embodiment, the beacon interval duration is within a range extending from 1 second to 255 seconds, and the beacon period duration is 1 second, and the set interval is within a range extending from 6 milliseconds to 19 milliseconds.

The association timeout duration for the receiving device is defined as a number of beacon intervals that should pass without communication before the receiving device disassociates from the wireless network of the sending device. Also, the response interval duration for the receiving device is defined as a maximum number of beacon intervals that are allowed to pass before the receiving device should communicate its status to the sending device.

In one embodiment, the frame transmission type in the method of FIG. 9 is a broadcast network discovery frame. In this embodiment, the payload specification of the distributed asset management (DAMC) protocol corresponding to the broadcast network discovery frame includes:
- an identification of a device type of the sending device,
- an identification of a message type as the broadcast network discovery frame,
- an identification of an alternate channel to be used for subsequent communication,
- a specification of a broadcast interval duration of the sending device,
- a specification of a response interval duration for the receiving device,
- an identification of data types included within the data portion of the payload of the broadcast network discovery frame,
- the data portion of the payload of the broadcast network discovery frame, and
- a specification of cyclic redundancy data associated with the payload of the broadcast network discovery frame.

In one embodiment, the type of data included within the data portion of the payload of the broadcast network discovery frame includes one or more of device date and time, device identification, device location, device velocity, and device differential global positioning system correction. Also, in one embodiment, the broadcast interval duration of the sending device is an integer value in seconds between successive broadcast periods. Each broadcast period is a duration of time during which MAC frames of the broadcast network discovery frame type are successively transmitted at a set interval. In one embodiment, the broadcast interval duration is within a range extending from 1 second to 255 seconds, and the broadcast period duration is 1 second, and the set interval is within a range extending from 6 milliseconds to 19 milliseconds. In one embodiment, the response interval duration for the receiving device is a maximum number of broadcast intervals that are allowed to pass before the receiving device should communicate its status to the sending device.

In one embodiment, the frame transmission type in the method of FIG. 9 is a command frame. In this embodiment, the payload specification of the distributed asset management (DAMC) protocol corresponding to the command frame includes:
- an identification of a device type of the sending device,
- an identification of a message type as the command frame,
- a specification of a length of data included within the data portion of the payload of the command frame,
- an identification of a type of command communicated in the command frame, the data portion of the payload of the command frame, and
- a specification of cyclic redundancy data associated with the payload of the command frame.

In one embodiment, the frame transmission type in the method of FIG. 9 is a data frame. In this embodiment, the payload specification of the distributed asset management (DAMC) protocol corresponding to the data frame includes:
- an identification of a device type of the sending device,
- an identification of a message type as the data frame,
- a specification of a length of data included within the data portion of the payload of the data frame,
- an identification of a packet type associated with the data included within the data portion of the payload of the data frame,
- the data portion of the payload of the data frame, and
- a specification of cyclic redundancy data associated with the payload of the data frame.

In one embodiment, the identification of the packet type in the data frame includes identification of the data included within the data portion of the payload of the data frame as either stored data or real-time data.

In one embodiment, the frame transmission type in the method of FIG. 9 is a acknowledgement frame. In this embodiment, the payload specification of the distributed asset management (DAMC) protocol corresponding to the acknowledgement frame includes:
- an identification of a device type of the sending device,
- an identification of a message type as the acknowledgement frame,
- a specification of a length of the acknowledgement frame,
- a specification of an acknowledgement value as either successful acknowledgement or failed acknowledgement,
- an identification of a sequence number of a communication that is acknowledged by the acknowledgement frame,
- an identification of a packet identifier that is acknowledged by the acknowledgement frame in the case of a successful acknowledgement, or an identification of an error type in the case of a failed acknowledgement,
- a specification of a ready state of the sending device,
- a specification of a incrementing counter value indicating a sequence of processed commands,
- a specification of a sleep timer value used by the sending device,
- an identification of a current network channel used by the sending device for communication over the wireless network, and
- a specification of cyclic redundancy data associated with the payload of the acknowledgement frame.

In one embodiment, the ready state of the sending device in the acknowledgement frame is specified as either zero if the sending device is ready to receive more data, or as a number of seconds greater than zero to be delayed before the sending device is ready to receive more data. In either of the embodiments discussed above with regard to the method of FIG. 9, the device type of the sending device is one of a fixed reader device, a mobile reader device, a handheld device, and a tag device.

Figure 10:
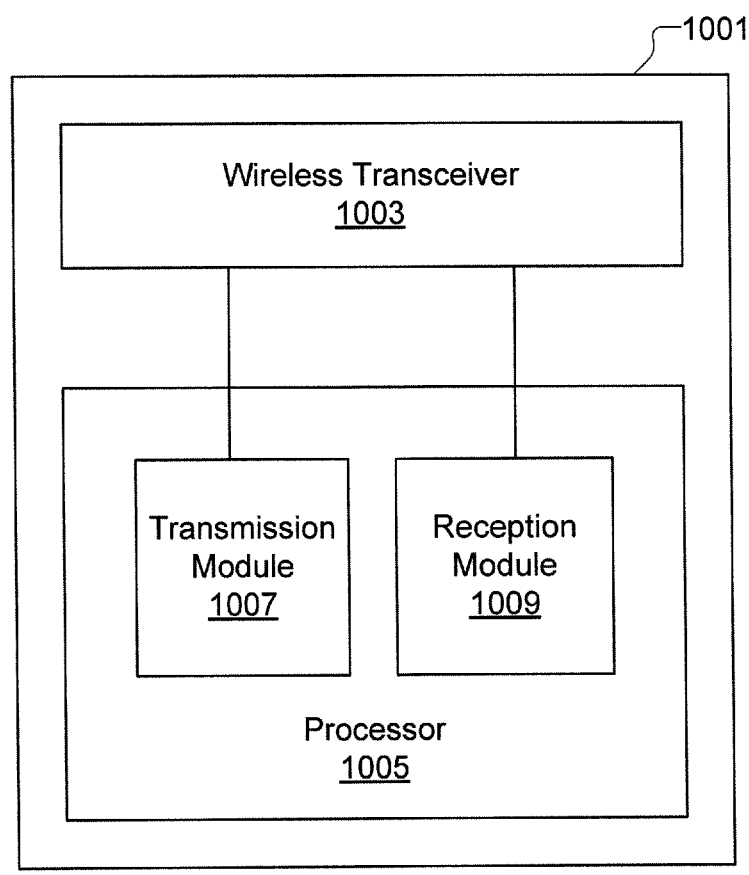
FIG. 10 shows a diagram of a device defined to communicate data over a wireless network in accordance with the distributed asset management protocol, in accordance with one embodiment of the present invention.

FIG. 10 shows a diagram of a device 1001 defined to communicate data over a wireless network in accordance with the distributed asset management (DAMC) protocol, in accordance with one embodiment of the present invention. In one embodiment, the device 1001 is one of a fixed reader device, a mobile reader device, a handheld device, and a tag device. The device 1001 includes a wireless transceiver 1003 and a processor 1005. The processor 1005 is defined to operate in conjunction with the wireless transceiver 1003 to transmit and receive wireless communications in accordance with the distributed asset management protocol.

The processor 1005 includes a transmission module 1007 defined to generate a MAC frame to be transmitted over the wireless network. Generating the MAC frame includes setting a frame control field of the MAC frame to indicate a frame transmission type. In one embodiment, the frame transmission type is one of a beacon frame, a broadcast network discovery frame, a data frame, a command frame, and an acknowledgement frame. Generating the MAC frame also includes defining a payload portion of the MAC frame in accordance with a payload specification of the distributed asset management (DAMC) protocol corresponding to the indicated frame transmission type. The transmission module 1007 is also defined to direct the wireless transceiver 1003 to transmit the generated MAC frame over the wireless network.

The processor 1005 also includes a reception module 1009 defined to process MAC frames received through the wireless transceiver 1003 from the wireless network. The reception module 1009 is defined to recognize the frame transmission type of the received MAC frame. The reception module 1009 is also defined to process the payload portion of the received MAC frame in accordance with the payload specification of the distributed asset management (DAMC) protocol corresponding to the recognized frame transmission type.

In one embodiment, the processor 1005 and wireless transceiver 1003 are defined to be compliant with both an IEEE 802.15.4 standard and the distributed asset management (DAMC) protocol. Non-payload portions of the MAC frame are defined to be processed by wireless communication devices that are compliant with the IEEE 802.15.4 standard. And, payload portions of the MAC frame are defined to be processed by wireless communication devices that are compliant with the distributed asset management (DAMC) protocol.

mLOCK as Example Tag Device

To provide an exemplary context for the DAMC protocol described herein, a brief description is provided below of an mLOCK device that incorporates an IEEE 802.15.4 compliant integrated circuit radio and sufficient computing and associated memory capability to implement the DAMC protocol. It should be understood that although the DAMC protocol is well-suited for use with the example mLOCK device described below, the DAMC protocol is not restricted to use with the example mLOCK device or to the particular architecture of the example mLOCK device.

Figure 11:
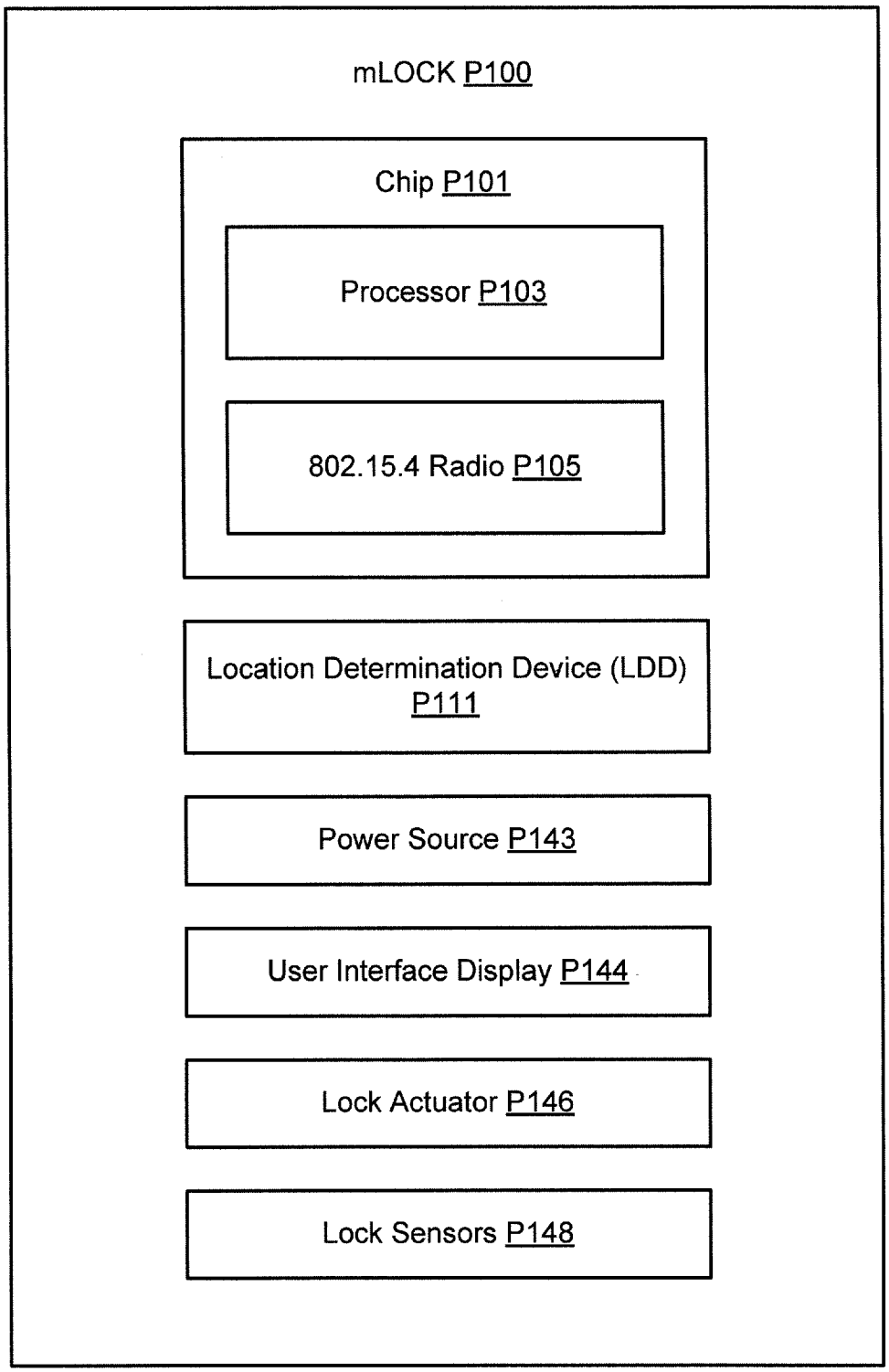
FIG. 11 is an illustration showing an mLOCK device architecture, in accordance with one embodiment of the present invention.

FIG. 11 is an illustration showing an mLOCK P100 device architecture, in accordance with one embodiment of the present invention. The mLOCK P100 includes a radiofrequency (RF) tracking and communication system and a security lock mechanism. The mLOCK P100 includes a processor P103 defined on a chip P101. The mLOCK P100 also includes a radio P105 defined on the chip P101. The radio P105 operates at an international frequency and is defined to efficiently manage power consumption. In one embodiment, the radio P105 is defined as an Institute of Electrical and Electronics Engineers (IEEE) 802.15.4 compliant radio P105. The radio P105 is connected to electrically communicate with the processor P103. It should be appreciated that implementation of the IEEE 802.15.4 compliant radio P105 provides for international operation and secure communications, as well as efficient power management.

The mLOCK P100 further includes a location determination device (LDD) P111 defined to electrically communicate with the processor P103 of the chip P101. In one embodiment, the LDD P111 is defined as a Global Positioning System (GPS) receiver device. Additionally, the mLOCK P100 includes a power source P143 defined to supply power to the processor P103, the radio P105, the LDD Pill, and other powered mLOCK P100 components as described below with regard to FIG. 12. In various embodiments, the power source P143 is rechargeable, and may be supported in a tricklecharging manner by solar energy The mLOCK P100 implements a power management system defined to enable long-term mLOCK P100 deployment with minimal maintenance.

The mLOCK P100 is an electronic lock that secures an asset, such as cargo within a shipping container, by controlling the ability to operate a locking mechanism of the mLOCK P100 based on proximity to secure networks, geographic locations, or via user commands through a radio link. The locking mechanism of the mLOCK P100 is secured through a mechanical mechanism that inhibits opening a shackle of the mLOCK P100 unless an electro-mechanical lock actuator P146 enables such operation of the mLOCK P100.

The lock actuator P146 utilizes a motor that is controlled through power amplified electronics via the processor P103. The lock actuator P146 functions to provide power and signal conversion, based on low power signals generated by the processor P103, to generate enough power so as to appropriately control operation of a lock motor. The lock motor is defined to provide mechanical locking and unlocking of the mLOCK P100 shackle. In one embodiment, the lock motor is a DC motor. Also, in one embodiment, a spring is disposed to link the lock motor output shaft to a cam mechanism that enables/disables operation of the mLOCK P100, i.e., enables/disables operation of the mLOCK P100 shackle. In one embodiment, the lock actuator P146 is defined as an H-Bridge amplifier designed for low voltage DC motors.

The mLOCK P100 also includes one or more lock sensors P148 to determine the lock actuator P146 state (locked or unlocked) and the mLOCK P100 shackle state. In one embodiment, the lock sensor P148 is a limit switch that conveys data indicating a discrete state of the lock actuator P146, i.e., "locked" or "unlocked." The processor P103 is defined to use the lock sensor P148 signal data to determine when the lock actuator P146 is in the correct state during lock actuation, thereby providing feedback to the processor P103 to enable stop/start control of the lock motor by the lock actuator P146. If the lock sensor P148 indicates that the lock mechanism is in the correct commanded state, the processor P103 will not take any control actions. The lock sensors P148 can include a shackle sensor (or cable sensor). The shackle sensor indicates whether the shackle is actually opened or closed. Therefore, the shackle sensor is the indicator that the locking mechanism of the mLOCK P100 has actually been opened or closed, thereby indicating the security state of an asset to which the mLOCK P100 is attached.

The mLOCK P100 also includes a user interface display P144 through which visual information can be conveyed to a user of the mLOCK P100 to enable understanding of a current state of the mLOCK P100. In one embodiment, the user interface display P144 is defined as a two line by eight character liquid crystal display. However, it should be understood that in other embodiments the user interface display P144 can be defined as essentially any type and size of visual display suitable for use in electronic components to visually display textual information, so long as the user interface display P144 fits within the form factor of the mLOCK P100. In one embodiment, the mLOCK P100 includes at least one user activatable button connected to enable selection of different screens to be rendered on the user interface display P144. It should be understood that the user interface display P144 provides a user interface to the processor P103. In one embodiment, the different screens available for rendering in the user interface display P144 convey information including, but not limited to:

a) the mLOCK P100 identification Number,
 b) the mLOCK P100 state (locked or unlocked),
 c) the mLOCK P100 location and time (GPS location),
 d) modem status, if modem is included in mLOCK P100, and
 e) network status, if the mLOCK P100 is currently in a trusted network area.

In one embodiment, the mLOCK P100 is defined as a self-contained battery operated device capable of being attached to an asset, such as a shipping container, to provide secure tracking and communications associated with movement and status of the asset, and to provide access security for the asset. In certain embodiments, the mLOCK P100 may also be configured to provide/perform security applications associated with the asset. Through communication with local and global communication networks, e.g., beacon and broadcast networks that implement the DAMC protocol, the mLOCK P100 is capable of communicating data associated with its assigned asset and its security state while the asset is in transit, onboard a conveyance means (e.g., ship, truck, train), and/or in terminal.

As will be appreciated from the following description, the mLOCK P100 provides complete autonomous location determination and logging of asset position (latitude and longitude) anywhere in the world. The mLOCK P100 electronics provide an ability to store data associated with location waypoints, security events, and status in a non-volatile memory onboard the mLOCK P100. The mLOCK P100 is also defined to support segregation and prioritization of data storage in the non-volatile memory. Communication of commercial and/or security content associated with mLOCK P100 operation, including data generated by external devices interfaced to the mLOCK P100, can be virtually and/or physically segregated in the non-volatile memory.

Moreover, in one embodiment, a wireless communication system of the mLOCK P100 is defined to detect and negotiate network access with network gateways at long-range. The mLOCK P100 processor P103 is defined to perform all necessary functions to securely authenticate a serial number of the mLOCK P100, provide encrypted bi-directional communication between the mLOCK P100 and a reader device within a wireless network, and maintain network connectivity when in range of a network gateway.

In one embodiment, the various components of the mLOCK P100 are disposed on a printed circuit board, with required electrical connections between the various components made through conductive traces defined within the printed circuit board. In one exemplary embodiment, the printed circuit board of the mLOCK P100 is a low cost, rigid, four layer, 0.062" FR-4 dielectric fiberglass substrate. However, it should be understood that in other embodiments, other types of printed circuit boards or assemblies of similar function may be utilized as a platform for support and interconnection of the various mLOCK P100 components. In one particular embodiment, the chip P101 is defined as a model CC2430-64 chip manufactured by Texas Instruments, and the LDD P111 is implemented as a model GSC3f/LP single chip ASIC manufactured by SiRF.

Figure 12:
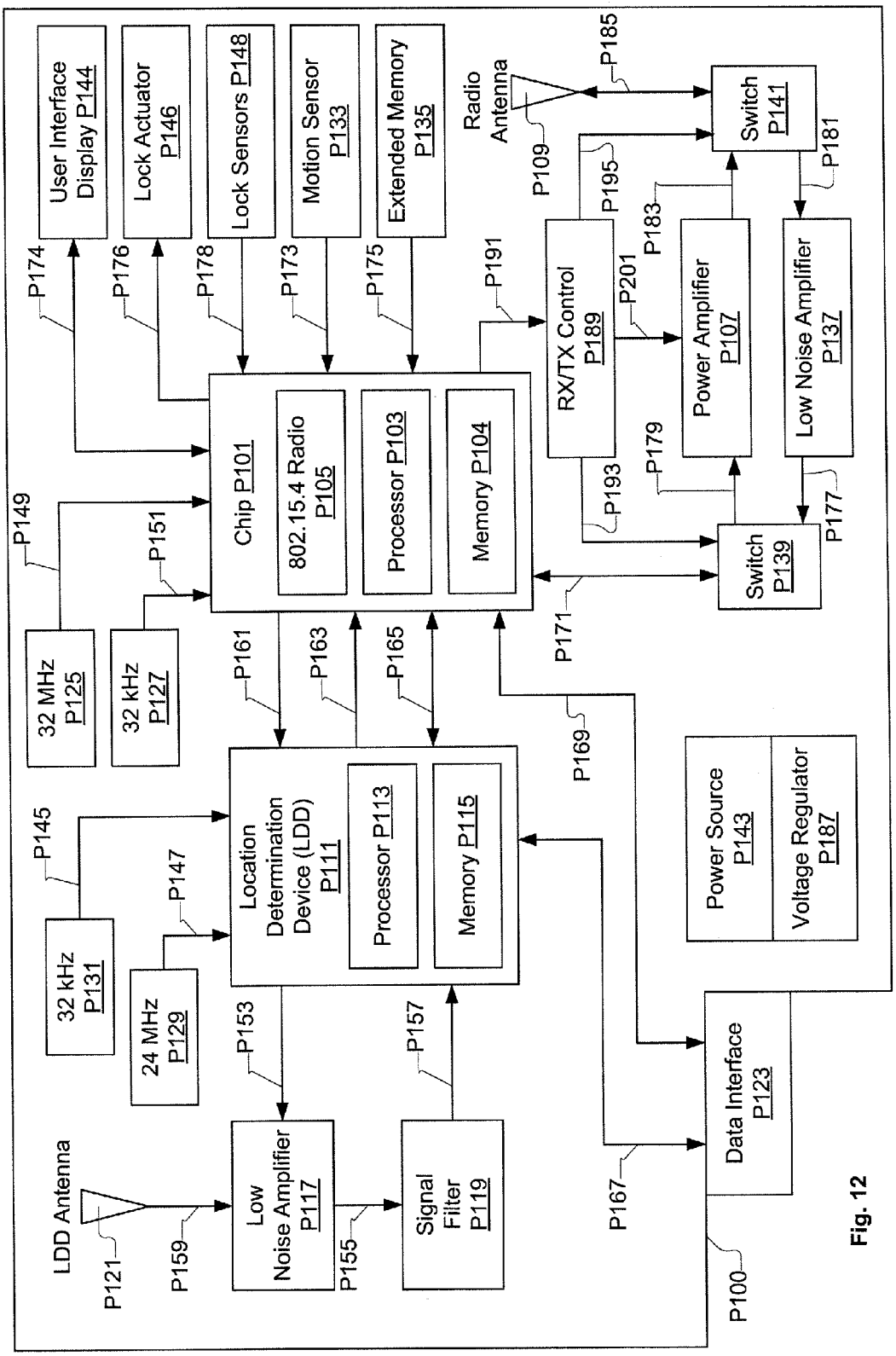
FIG. 12 is an illustration showing a schematic of the mLOCK of FIG. 11, in accordance with one embodiment of the present invention.

FIG. 12 is an illustration showing a schematic of the mLOCK P100 of FIG. 11, in accordance with one embodiment of the present invention. In various exemplary embodiments, the chip P101 that includes both the processor P103 and the radio P105 can be implemented as either of the following chips, among others:

a model CC2430 chip manufactured by Texas Instruments,
a model CC2431 chip manufactured by Texas Instruments,
a model CC2420 chip manufactured by Texas Instruments,
a model MC13211 chip manufactured by Freescale,
a model MC13212 chip manufactured by Freescale, or
a model MC13213 chip manufactured by Freescale.

In each of the above-identified chip P101 embodiments, the radio P105 is defined as an IEEE 802.15.4 compliant radio that operates at a frequency of 2.4 GHz (gigaHertz). It should be understood, that the type of chip P101 may vary in other embodiments, so long as the radio P105 is defined to operate at an international frequency and provide power management capabilities adequate to satisfy mLOCK P100 operation and deployment requirements. Additionally, the type of chip P101 may vary in other embodiments, so long as the processor P103 is capable of servicing the requirements of the mLOCK P100 when necessary, and enables communication via the radio P105 implemented onboard the chip P101. Also, the chip P101 includes a memory P104, such as a random access memory (RAM), that is read and write accessible by the processor P103 for storage of data associated with mLOCK P100 operation.

The mLOCK P100 also includes a power amplifier P107 and a low noise amplifier (LNA) P137 to improve the communication range of the radio P105. The radio P105 is connected to receive and transmit RF signals through a receive/transmit (RX/TX) switch P139, as indicated by arrow P171. A transmit path for the radio P105 extends from the radio P105 to the switch P139, as indicated by arrow P171, then from the switch P139 to the power amplifier P107, as indicated by arrow P179, then from the power amplifier P107 to another RX/TX switch P141, as indicated by arrow P183, then from the RX/TX switch P141 to a radio antenna P109, as indicated by arrow P185.

A receive path for the radio P105 extends from the radio antenna P109 to the RX/TX switch P141, as indicated by arrow P185, then from the RX/TX switch P141 to the LNA P137, as indicated by arrow P181, then from the LNA P137 to the RX/TX switch P139, as indicated by arrow P177, then from the RX/TX switch P139 to the radio P105, as indicated by arrow P171. The RX/TX switches P139 and P141 are defined to operate cooperatively such that the transmit and receive paths for the radio P105 can be isolated from each other when performing transmission and reception operations, respectively. In other words, the RX/TX switches P139 and P141 can be operated to route RF signals through the power amplifier P107 during transmission, and around the power amplifier P107 during reception. Therefore, the RF power amplifier P107 output can be isolated from the RF input of the radio P105.

In one embodiment, each of the RX/TX switches P139 and P141 is defined as a model HMC174MS8 switch manufactured by Hittite. However, it should be understood that in other embodiments each of the RX/TX switches P139 and P141 can be defined as another type of RF switch so long as it is capable of transitioning between transmit and receive channels in accordance with a control signal. Also, in one embodiment, the power amplifier P107 is defined as a model HMC414MS8 2.4 GHz power amplifier manufactured by Hittite. However, it should be understood that in other embodiments the power amplifier P107 can be defined as another type of amplifier so long as it is capable of processing RF signals for long-range communication and is power manageable in accordance with a control signal. In one embodiment, the power amplifier P107 and RX/TX switches P139 and P141 can be combined into a single device, such as the model CC2591 device manufactured by Texas Instruments by way of example.

The mLOCK P100 is further equipped with an RX/TX control circuit P189 defined to direct cooperative operation of the RX/TX switches P139 and P141, and to direct power control of the power amplifier P107 and LNA P137. The RX/TX control circuit P189 receives an RX/TX control signal from the chip P101, as indicated by arrow P191. In response to the RX/TX control signal, the RX/TX control circuit P189 transmits respective control signals to the RX/TX switches P139 and P141, as indicated by arrows P193 and P195, respectively, such that continuity is established along either the transmission path or the receive path, as directed by the RX/TX control signal received from the chip P101. Also, in response to the RX/TX control signal, the RX/TX control circuit P189 transmits a power control signal to the power amplifier P107, as indicated by arrow P201. This power control signal directs the power amplifier P107 to power up when the RF transmission path is to be used, and to power down when the RF transmission path is to be idled.

In one embodiment, the LDD P111 includes a processor P113 and a memory P115, such as a RAM, wherein the memory P115 is read and write accessible by the processor P113 for storage of data associated with LDD Pill operation. In one embodiment, the LDD P111 and chip P101 are interfaced together, as indicated by arrow P161, such that the processor P103 of the chip P101 can communicate with the processor P113 of the LDD P111 to enable programming of the LDD P111. In various embodiments, the interface between the LDD P111 and chip P101 may be implemented using a serial port, such as a universal serial bus (USB), conductive traces on the mLOCK P100 printed circuit board, or essentially any other type of interface suitable for conveyance of digital signals. Additionally, it should be understood that in some embodiments, the processor P113 of the LDD P111 can be defined to work in conjunction with, or as an alternate to, the processor P103 of chip P101 in servicing the requirements of the mLOCK P100 when necessary.

Also, in one embodiment, a pin of the LDD P111 is defined for use as an external interrupt pin to enable wakeup of the LDD P111 from a low power mode of operation, i.e., sleep mode. For example, the chip P101 can be connected to the external interrupt pin of the LDD P111 to enable communication of a wakeup signal from the chip P101 to the LDD P111, as indicated by arrow 165. The LDD P111 is further connected to the chip P101 to enable communication of data from the LDD P111 to the chip P101, as indicated by arrow P163.

The LDD P111 is also defined to receive an RF signal, as indicated by arrow P157. The RF signal received by the LDD P111 is transmitted from the LDD antenna P121 to a low noise amplifier (LNA) P117, as indicated by arrow P159. Then, the RF signal is transmitted from the LNA P117 to a signal filter P119, as indicated by arrow P155. Then, the RF signal is transmitted from the filter P119 to the LDD P111, as indicated by arrow P157.

Additionally, in one embodiment, the LDD P111 is defined as a single chip ASIC, including an onboard flash memory P115 and an ARM processor core P113. For example, in various embodiments, the LDD P111 can be implemented as either of the following types of GPS receivers, among others:
  a model GSC3f/LP GPS receiver manufactured by SiRF,
  a model GSC2f/LP GPS receiver manufactured by SiRF,
  a model GSC3e/LP GPS receiver manufactured by SiRF,
  a model NX3 GPS receiver manufactured by Nemerix, or
  a model NJ030A GPS receiver manufactured by Nemerix.

The LNA P117 and signal filter P119 are provided to amplify and clean the RF signal received from the LDD antenna P121. In one embodiment, the LNA P117 can be implemented as an L-Band device, such as an 18 dBi low noise amplifier. For example, in this embodiment the LNA P117 can be implemented as a model UPC8211TK amplifier manufactured by NEC. In another embodiment, the LNA P117 can be implemented as a model BGA615L7 amplifier manufactured by Infineon. Also, the LNA P117 is defined to have a control input for receiving control signals from the LDD P111, as indicated by arrow P153. Correspondingly, the LNA P117 is defined to understand and operate in accordance with the control signals received from the LDD P111. In the embodiment where the LDD P111 is implemented as the model GSC3f/LP GPS receiver by SiRF, a GPIO4 pin on the GSC3f/LP chip can be used to control the LNA P117 power, thereby enabling the LNA P117 to be powered down and powered up in accordance with a control algorithm.

In one embodiment, the signal filter P119 is defined as an L-Band device, such as a Surface Acoustic Wave (SAW) filter. For example, in one embodiment, the signal filter P119 is implemented as a model B39162B3520U410 SAW filter manufactured by EPCOS Inc. As previously stated, an output of the signal filter P119 is connected to an RF input of the LDD P111, as indicated by arrow P157. In one embodiment, a 50 ohm micro-strip trace on the printed circuit board of the mLOCK P100 is used to connect the output of the signal filter P119 to the RF input of the LDD P111. Also, in one embodiment, the signal filter P119 is tuned to pass RF signals at 1575 MHz to the RF input of the LDD P111.

The mLOCK 100 also includes a data interface P123 defined to enable electrical connection of various external devices to the LDD P111 and chip P101 of the mLOCK P100. For example, in one embodiment, the chip P101 includes a number of reconfigurable general purpose interfaces that are electrically connected to respective pins of the data interface P123. Thus, in this embodiment, an external device (such as a sensor for commercial and/or security applications) can be electrically connected to communicate with the chip P101 through the data interface P123, as indicated by arrow P169. The LDD P111 is also connected to the data interface P123 to enable electrical communication between an external entity and the LDD P111, as indicated by arrow P167. For example, an external entity may be connected to the LDD P111 through the data interface P123 to program the LDD P111. It should be appreciated that the data interface P123 can be defined in different ways in various embodiments. For example, in one embodiment, the data interface P123 is defined as a serial interface including a number of pins to which an external device may connect. In other example, the data interface may be defined as a USB interface, among others.

The mLOCK 100 also includes an extended memory P135 connected to the processor P103 of the chip P101, as indicated by arrow P175. The extended memory P135 is defined as a non-volatile memory that can be accessed by the processor P103 for data storage and retrieval. In one embodiment, the extended memory P135 is defined as a solid-state non-volatile memory, such as a flash memory. The extended memory P135 can be defined to provide segmented non-volatile storage, and can be controlled by the software executed on the processor P103. In one embodiment, separate blocks of memory within the extended memory P135 can be allocated for dedicated use by either security applications or commercial applications. In one embodiment, the extended memory P135 is a model M25P10-A flash memory manufactured by ST Microelectronics. In another embodiment, the extended memory P135 is a model M25PE20 flash memory manufactured by Numonyx. It should be understood that in other embodiments, many other different types of extended memory P135 may be utilized so long as the extended memory P135 can be operably interfaced with the processor P103.

The mLOCK P100 also includes a motion sensor P133 in electrical communication with the chip P101, i.e., with the processor P103, as indicated by arrow P173. The motion sensor P133 is defined to detect physical movement of the mLOCK P100, and thereby detect physical movement of the asset to which the mLOCK P100 is affixed. The processor P103 is defined to receive motion detection signals from the motion sensor P133, and based on the received motion detection signals determine an appropriate mode of operation for the mLOCK P100. Many different types of motion sensors P133 may be utilized in various embodiments. For example, in some embodiments, the motion sensor P133 may be defined as an accelerometer, a gyro, a mercury switch, a micro-pendulum, among other types. Also, in one embodiment, the mLOCK P100 may be equipped with multiple motion sensors P133 in electrical communication with the chip P101. Use of multiple motion sensors P133 may be implemented to provide redundancy and/or diversity in sensing technology/stimuli. For example, in one embodiment, the motion sensor P133 is a model ADXL330 motion sensor manufactured by Analog Devices. In another exemplary embodiment, the motion sensor P133 is a model ADXL311 accelerometer manufactured by Analog Devices. In yet another embodiment, the motion sensor P133 is a model ADXRS50 gyro manufactured by Analog Devices.

The mLOCK P100 also includes a voltage regulator P187 connected to the power source P143. The voltage regulator P187 is defined to provide a minimum power dropout when the power source P143 is implemented as a battery. The voltage regulator P187 is further defined to provide optimized voltage control and regulation to the powered components of the mLOCK P100. In one embodiment, a capacitive filter is connected at the output of the voltage regulator P187 to work in conjunction with a tuned bypass circuit between the power plane of the mLOCK P100 and a ground potential, so as to minimize noise and RF coupling with the LNA's P117 and P137 of the LDD P111 and radio P105, respectively.

Also, in one embodiment, the radio P105 and LDD P111 are connected to receive common reset and brown out protection signals from the voltage regulator P187 to synchronize mLOCK P100 startup and to protect against executing corrupted memory (P115/P104) during a slow ramping power up or during power source P143, e.g., battery, brown out. In one exemplary embodiment, the voltage regulator P187 is a model TPS77930 voltage regulator manufactured by Texas Instruments. In another exemplary embodiment, the voltage regulator P187 is a model TPS77901 voltage regulator manufactured by Texas Instruments. It should be appreciated that different types of voltage regulator P187 may be utilized in other embodiments, so long as the voltage regulator is defined to provide optimized voltage control and regulation to the powered components of the mLOCK P100.

To enable long-term mLOCK P100 deployment with minimal maintenance, the processor P103 of the chip P101 is operated to execute a power management program for the mLOCK P100. The power management program controls the supply of power to various components within the mLOCK P100, most notably to the LDD P111 and radio P105. The mLOCK P100 has four primary power states:

1) LDD P111 Off and radio P105 Off,
2) LDD P111 Off and radio P105 On,
3) LDD P111 On and radio P105 Off, and
4) LDD P111 On and radio P105 On.

The power management program is defined such that a normal operating state of the mLOCK P100 is a sleep mode in which both the LDD P111 and radio P105 are powered off. The power management program is defined to power on the LDD P111 and/or radio P105 in response to events, such as monitored conditions, external stimuli, and pre-programmed settings. For example, a movement event or movement temporal record, as detected by the motion sensor P133 and communicated to the processor P103, may be used as an event to cause either or both of the LDD P111 and radio P105 to be powered up from sleep mode. In another example, a pre-programmed schedule may be used to trigger power up of either or both of the LDD P111 and radio P105 from sleep mode. Additionally, other events such as receipt of a communications request, external sensor data, geolocation, or combination thereof, may serve as triggers to power up either or both of the LDD P111 and radio P105 from sleep mode.

The power management program is also defined to power down the mLOCK P100 components as soon as possible following completion of any requested or required operations. Depending on the operations being performed, the power management program may direct either of the LDD P111 or radio P105 to power down while the other continues to operate. Or, the operational conditions may permit the power management program to simultaneously power down both the LDD P111 and radio P105.

To support the power management program, the mLOCK P100 utilizes four separate crystal oscillators. Specifically, with reference to FIG. 12, the chip P101 utilizes a 32 MHz (megaHertz) oscillator P125 to provide a base operational clock for the chip P101, as indicated by arrow P149. The chip P101 also utilizes a 32 kHz (kiloHertz) oscillator P127 to provide a real-time clock for wakeup of the chip P101 from the sleep mode of operation, as indicated by arrow P151. The LDD P111 utilizes a 24 MHz oscillator P129 to provide a base operational clock for the LDD P111, as indicated by arrow P147. Also, the LDD P111 utilizes a 32 kHz oscillator P131 to provide a real-time clock for wakeup of the LDD P111 from the sleep mode of operation, as indicated by arrow P145. It should be understood, however, that in other embodiments, other oscillator arrangements may be utilized to provide the necessary clocking for the chip P101 and LDD P111. For example, crystal oscillators of different frequency may be used, depending on the operational requirements of the LDD P111 and chip P101.

The lock actuator P146 is defined to receive control signals from the processor P103, as indicated by arrow P176. In response to the control signals received from the processor P103, the lock actuator P146 is defined to generate two discrete amplified signals to provide power to control the lock motor mechanism. The two discrete amplified signals provided by the lock actuator P146 provide power and the correct current polarity to drive the lock motor in each of two possible directions, respectively.

The lock sensors P148 are defined to convey data signals to the processor P103, as indicated by arrow P178. The data signals conveyed by the lock sensors P148 includes a first data signal providing a status of the mLOCK P100 shackle position (open/closed), and a second data signal providing a status of the mLOCK P100 lock motor position (locked/unlocked). The data signals conveyed by the lock sensor P148 are monitored by the processor P103 to enable control and monitoring of the mLOCK P100 state.

The user interface display P144 and associated user input button(s) are defined to bi-directionally communicate with the processor P103. The user interface display P144 is managed by the processor P103. In one embodiment, data transmitted from the processor P103 to the user interface display P144 is rendered in the user interface display P144 in text form, i.e., in alpha-numeric form. Additionally, the processor P103 monitors the status of the one or more user input buttons to allow the user to control/select information rendered in the user interface display P144 and/or to trigger certain conditions in the mLOCK P100.

An inductive loop is integrated into the mLOCK P100 to provide for RF impedance matching between the various RF portions of the mLOCK P100. In one embodiment, the inductive loop is tuned to provide a 0.5 nH (nanoHertz) reactive load over a wavelength trace. In one embodiment, the impedance match between the RF output from the radio P105 and the RX/TX switch P139 is 50 ohms. Also, the RF power amplifier P107 is capacitively coupled with the RX/TX switch P141. Additionally, in one embodiment, to provide for decoupling of the power source P143 from the radio P105, eight high frequency ceramic capacitors are tied between the power pins of the chip P101 and the ground potential of the mLOCK P100.

In one embodiment, a power plane of the chip P101 is defined as a split independent inner power plane that is DC-coupled with the LDD P111 power plane through an RF choke and capacitive filter. In this embodiment, noise from a phase lock loop circuit within the radio P105 will not couple via the inner power plane of the chip P101 to the power plane of the LDD P111. In this manner, radio harmonics associated with operation of the radio P105 are prevented from significantly coupling with the LDD P111 during simultaneous operation of the both the radio P105 and LDD P111, thereby maintaining LDD P111 sensitivity.

An impedance matching circuit is also provided to ensure that the RF signal can be received by the LDD P111 without substantial signal loss. More specifically, the RF input to the LDD P111 utilizes an impedance matching circuit tuned for dielectric properties of the mLOCK P100 circuit board. In one embodiment, the connection from the LDD antenna P121 to the LNA P117 is DC-isolated from the RF input at the LNA P117 using a 100 pf (picofarad) capacitor, and is impedance matched to 50 ohms. Also, in one embodiment, the output of the LNA P117 is impedance matched to 50 ohms.

Figure 13:
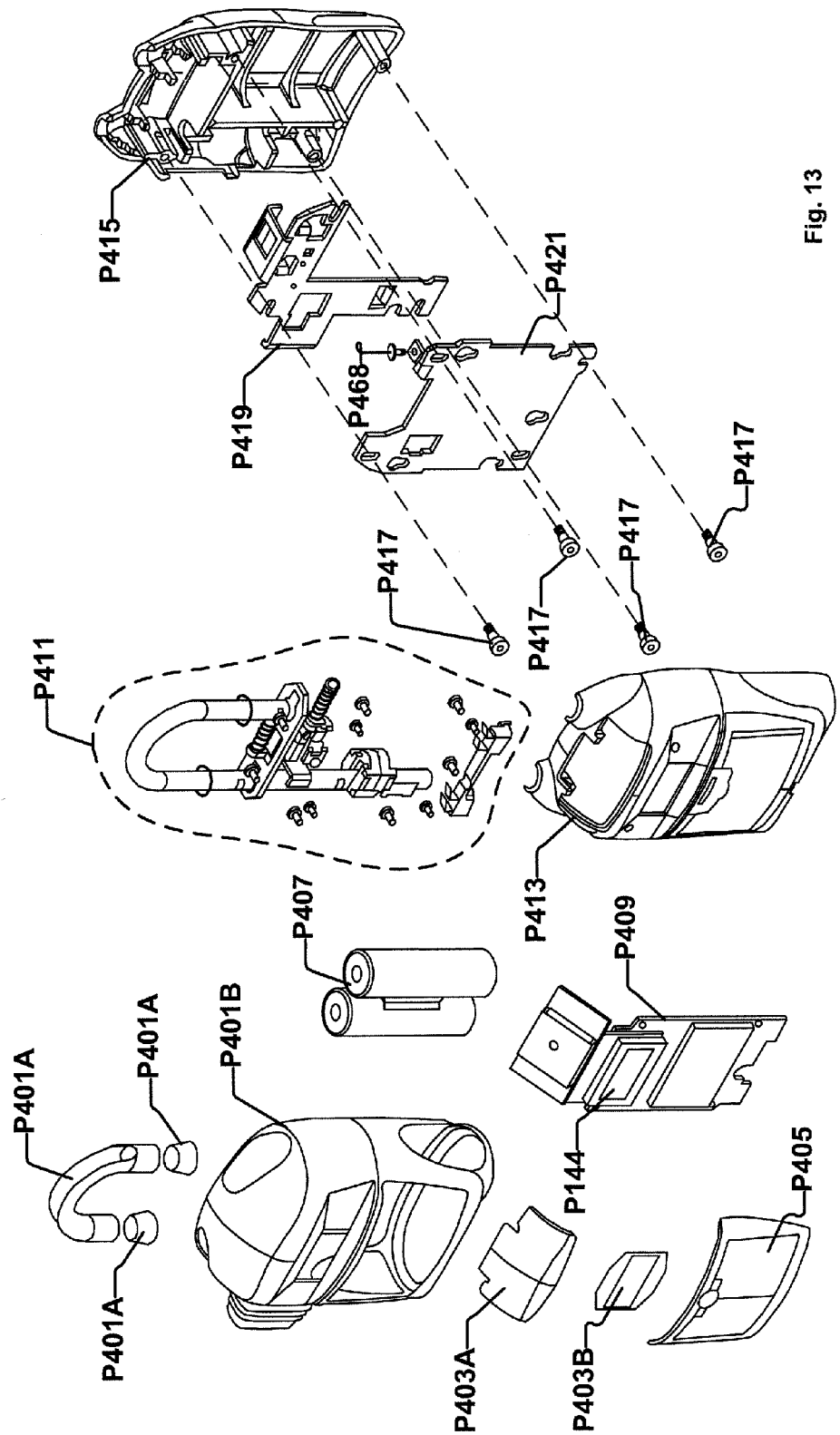
FIG. 13 shows the physical components of the mLOCK, in accordance with one embodiment of the present invention.
Figure 14:
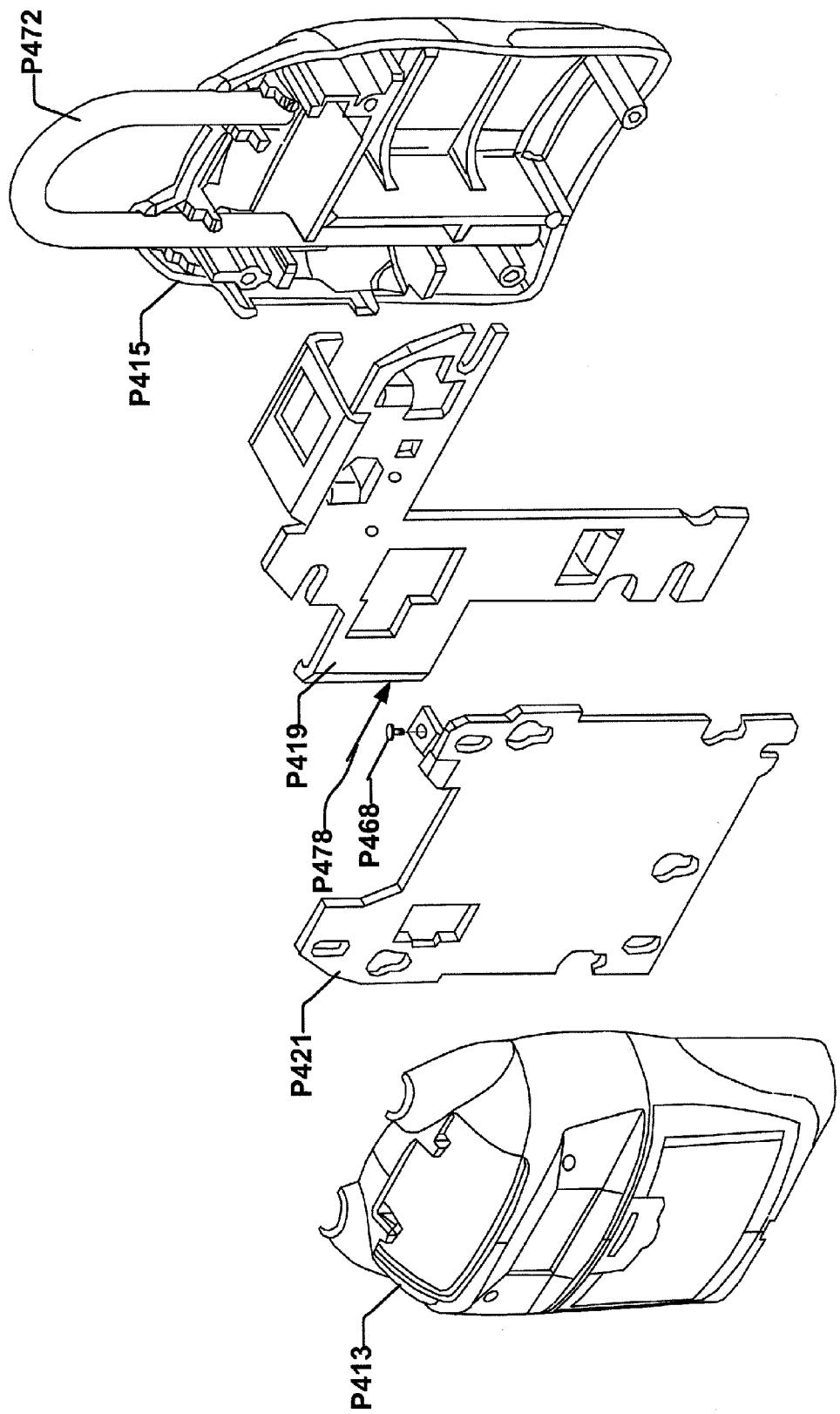
FIG. 14 shows a closer expanded view of the front shell, rear shell, interlocking plate, and push plate, in accordance with one embodiment of the present invention.
Figure 15:
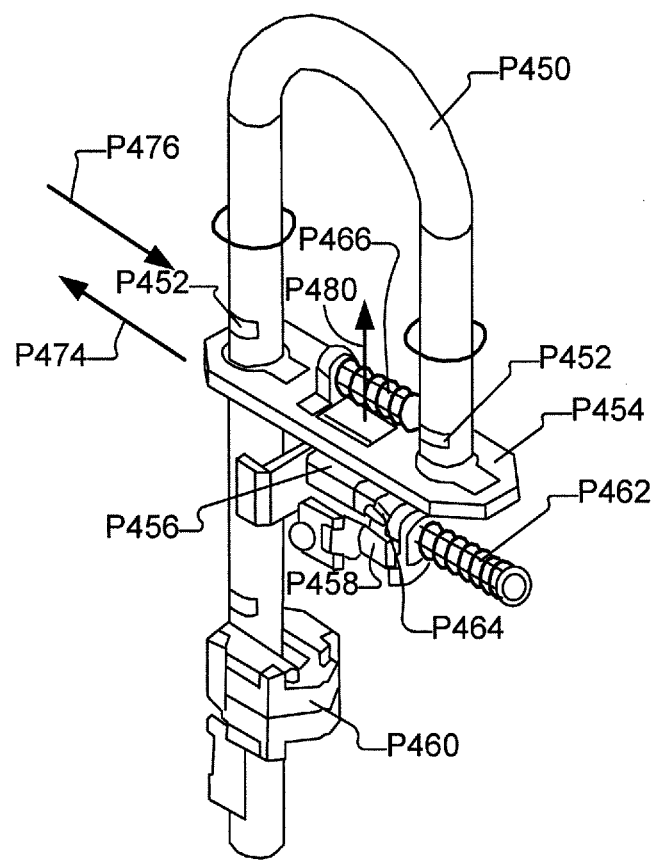
FIG. 15 shows an expanded view of the shackle and locking mechanism component of reference, in accordance with one embodiment of the present invention.

FIG. 13 shows the physical components of the mLOCK P100, in accordance with one embodiment of the present invention. Electronics P409 are defined on a printed circuit board as described above with regard to FIG. 12. In addition to the components described with regard to FIG. 12, the electronics P409 also include the user interface display P144. Electrical power for the mLOCK P100 is provided by a battery P407. Also, in one embodiment, the mLOCK P100 includes a solar film P405 defined to provide trickle-charging to the battery P407 to extend the battery P407 life. Shackle and locking mechanism components are also shown, as indicated by reference P411. FIG. 15 shows a more detailed view of the shackle and locking mechanism components of reference P411. The electronics P409, battery P407, solar film P405, shackle and locking mechanism components P411 are secured within the body, i.e., shell, of the mLOCK P100. FIG. 14 shows a closer expanded view of the front shell P413, rear shell P415, interlocking plate P421, and push plate P419, in accordance with one embodiment of the present invention.

The body of the mLOCK P100 is defined by a front shell P413 and a rear shell P415, which fit together in a sandwiched manner to enclose the mLOCK P100 components. Also, the mLOCK P100 includes a push plate P419 and an interlocking plate P421. The push plate is movable inside the shell of the mLOCK P100. The interlocking plate P421 is connected to the rear shell P415 by way of fasteners P417. When an external force is applied to move the push plate P419, the push plate P419 moves within the mLOCK P100 to disengage the locking mechanism of the shackle. This is described in more detail with regard to FIG. 15. The mLOCK P100 also includes button overlays P403A and a display overlay P403B. Also, to enhance durability in one embodiment, the mLOCK P100 can include rubber shackle molds P401A and a rubber body mold P401B.

It should be appreciated that the mLOCK P100 does not include any external assembly features that can be accessed to disassemble the mLOCK P100 once it has been locked. The mLOCK P100 can only be disassembled via a set screw P468 that is internal to the mLOCK P100. This set screw P468 is accessible only when the mLOCK P100 shackle has been unlocked and opened.

FIG. 15 shows an expanded view of the shackle and locking mechanism component of reference P411, in accordance with one embodiment of the present invention. A shackle P450 is defined to be disposed within a channel within the rear shell P415 of the mLOCK P100. The shackle P450 is defined to be movable along the channel length and is defined to be rotatable within the channel. A retainer P460 is attached to the shackle P450 to prevent the shackle P450 from being completely withdrawn from the channel and to control an amount of rotation of the shackle P450 within the channel. The shackle P450 is defined to insert into an opening P470 in the shell to close a shackle loop P472. The shackle P450 is also defined to release from the opening P470 in the shell to open the shackle loop P472.

A latch plate P454 is disposed inside the shell and is defined to engage the shackle P450 to lock the shackle P450, when the shackle P450 is inserted into the opening P470 in the shell to close the shackle loop P472. More specifically, the latch plate P454 is defined to move in a direction P474 to engage with locking slots P452 formed within the shackle P450, and to move in a direction P476 to disengage from the locking slots P452 formed within the shackle P450. As previously mentioned, the push plate P419 is disposed inside the shell and is defined to moved in the directions P474 and P476. Specifically, the push plate P419 is defined to move in the direction P476 when an external force is applied to the push plate P419, as indicated by arrow P478 in FIG. 14.

A motor P458 is mechanically fixed to the push plate P419, such that when the push plate P419 moves in the directions P474 or P476, the motor P458 moves with the push plate P419 in the same direction. A cam P456 is mechanically connected to be moved by the motor P458, in a direction P480, to engage with the latch plate P454. The cam P456 is rigidly connected to the motor P458 such that movement of the motor P458 through movement of the push plate P419 causes corresponding movement of the cam P456. Therefore, movement of the push plate P419 in the direction P476 by the applied external force P478, with the motor P458 operated to engage the cam P456 with the latch plate P454, causes the latch plate P454 to move in the direction P476 to disengage from the shackle P450, thereby freeing the shackle P450 to release from the shell to open the shackle loop P472.

A first spring P464 is defined to disengage the cam P456 from the latch plate P454 when the motor P458 is not powered to move the cam P456 to engage with the latch plate P454. In one embodiment, the first spring P464 is a torsional spring. A second spring P466 is defined to engage the latch plate P454 with the shackle P450, i.e., with the locking slots P452 of the shackle P450, in an absence of the applied external force P478 to move the push plate P419 when the cam P456 is also moved to engage the latch plate P454. A third spring P462 is defined to resist the external force P478 applied to move the push plate P419, such that the push plate P419 is returned to its home position in the absence of the applied external force P478.

The interlocking plate P421 is disposed within the body of the mLOCK P100 and secured to the shell P415 to cover the push plate P419, the motor P458, the cam P456, the latch plate P454, and the shackle P450, such that the locking mechanism of the mLOCK P100 cannot be accessed without removal of the interlocking plate P421. Also, the interlocking plate P421 is secured to the shell P415 by a fastener, i.e., set screw P468, that is only accessible through the opening P470 in the shell P415 when the shackle P450 is released from the opening P470 in the shell P415 to open the shackle loop P472.

It should be understood that the push plate P419 and the latch plate P454 physically interface with each other such that a force applied to the shackle P450 is transferred through the shackle P450 to the latch plate P454 to the push plate P419 to the shell P415. Therefore, the motor P458 and cam P456 are isolated from any force applied to the shackle P450. Additionally, the processor onboard the mLOCK P100 is defined to monitor a state of the mLOCK P100, and autonomously control the motor P458 to move the cam P456 based on the monitored state of the mLOCK P100.

As described herein, the mLOCK P100 is an electronic lock that can automatically secure an asset by activating a locking mechanism therein when the mLOCK P100 is either a) out of range of a secured network, b) has departed from a pre-determined waypoint based on latitude and longitude (GPS), c) has an expired schedule, or d) has detected motion. Also, the mLOCK P100 can be set to automatically unlock when the mLOCK P100 negotiates with a secure network or arrives at a user defined waypoint. The behavior of the mLOCK P100 can be modified by remote (and secure) commands, thereby allowing the mLOCK P100 behavior to be configured for specific uses at specific times, e.g., on a shipping container trip-by-trip basis.

The expansion of global commerce drives the shipping industry. Ships, trains, and trucks move cargo containers around the world relatively unattended and unnoticed. These are areas of vulnerability that terrorists and thieves can exploit. It should be appreciated that the mLOCK P100 is particularly well-suited for application in shipping container security, container trucking operations, and air cargo container security. In particular, the mLOCK P100 provides protection against hazardous materials being placed inside of a cargo container or valuable assets being removed from the container using its features described herein, including: a) door lock with shackle open/close/cut alarms, b) embedded location and tracking information, and c) worldwide, multi-mode communication links.

It should be understood that the technology implemented in the mLOCK P100 for tracking and monitoring distributed assets can also be used in devices other than the mLOCK P100. For example, the electronic architecture of the mLOCK P100, excluding the technology associated with the locking mechanisms, can be implemented in other devices that are used to monitor and track distributed assets. It should be understood that the mLOCK P100 and the other devices that implement a similar electronic architecture can be operated in accordance with the DAMC protocol as described herein.

The invention described herein can be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable code can also be distributed over a network of coupled computer systems so that the computer readable code is stored and executed in a distributed fashion. Additionally, a graphical user interface (GUI) implemented as computer readable code on a computer readable medium can be developed to provide a user interface for performing any embodiment of the present invention.

While this invention has been described in terms of several embodiments, it will be appreciated that those skilled in the art upon reading the preceding specifications and studying the drawings will realize various alterations, additions, permutations and equivalents thereof. Therefore, it is intended that the present invention includes all such alterations, additions, permutations, and equivalents as fall within the true spirit and scope of the invention.

What is claimed is:

1. A method for communicating data over a wireless network in accordance with a distributed asset management protocol, comprising:
   operating a sending device to generate a medium access control (MAC) frame to be transmitted over the wireless network, wherein generating the MAC frame includes,
      setting a frame control field of the MAC frame to indicate a beacon frame transmission type, and
      defining a payload portion of the MAC frame to include,
         an identification of a device type of the sending device,
         an identification of a type of data included within a data portion of the payload of the beacon frame,
         an identification of an alternate channel to be used for subsequent communication,
         a specification of a beacon interval duration of the sending device,
         a specification of an association timeout duration for the receiving device,
         a specification of a response interval duration for the receiving device,
         a specification of a length of data included within the data portion of the payload of the beacon frame,
         the data portion of the payload of the beacon frame, and
         a specification of cyclic redundancy data associated with the payload of the beacon frame;
   operating the sending device to transmit the generated MAC frame over the wireless network;
   operating a receiving device to receive the MAC frame over the wireless network;
   operating the receiving device to recognize the MAC frame as the indicated frame transmission type; and
   operating the receiving device to process the payload portion of the MAC frame in accordance with the payload specification of the distributed asset management protocol corresponding to the indicated frame transmission type.

2. The method for communicating data over the wireless network in accordance with the distributed asset management protocol as recited in claim 1, wherein each of the sending and receiving devices is compliant with both an IEEE 802.15.4 standard and the distributed asset management protocol, wherein non-payload portions of the MAC frame are defined to be processed by wireless communication devices that are compliant with the IEEE 802.15.4 standard, and wherein payload portions of the MAC frame are defined to be processed by wireless communication devices that are compliant with the distributed asset management protocol.

3. The method for communicating data over the wireless network in accordance with the distributed asset management protocol as recited in claim 1, wherein the device type of the sending device is one of a fixed reader device, a mobile reader device, a handheld device, and a tag device.

4. The method for communicating data over the wireless network in accordance with the distributed asset management protocol as recited in claim 1, wherein the type of data included within the data portion of the payload of the beacon frame includes one or more of device date and time, device identification, device location, device velocity, and device differential global positioning system correction.

5. The method for communicating data over the wireless network in accordance with the distributed asset management protocol as recited in claim 1, wherein the beacon interval duration of the sending device is an integer value in seconds between successive beacon periods, wherein each beacon period is a duration of time during which MAC frames of the beacon frame type are successively transmitted at a set interval.

6. The method for communicating data over the wireless network in accordance with the distributed asset management protocol as recited in claim 5, wherein the beacon interval duration is within a range extending from 1 second to 255 seconds, and wherein the beacon period duration is 1 second, and wherein the set interval is within a range extending from 6 milliseconds to 19 milliseconds.

7. The method for communicating data over the wireless network in accordance with the distributed asset management protocol as recited in claim 5, wherein the association timeout duration for the receiving device is a number of beacon intervals that should pass without communication before the receiving device disassociates from the wireless network of the sending device.

8. The method for communicating data over the wireless network in accordance with the distributed asset management protocol as recited in claim 5, wherein the response interval duration for the receiving device is a maximum number of beacon intervals that are allowed to pass before the receiving device should communicate its status to the sending device.

9. A method for communicating data over a wireless network in accordance with a distributed asset management protocol, comprising:
operating a sending device to generate a medium access control (MAC) frame to be transmitted over the wireless network, wherein generating the MAC frame includes,
setting a frame control field of the MAC frame to indicate a broadcast network discovery frame transmission type, and
defining a payload portion of the MAC frame to include,
an identification of a device type of the sending device,
an identification of a message type as the broadcast network discovery frame,
an identification of an alternate channel to be used for subsequent communication,
a specification of a broadcast interval duration of the sending device,
a specification of a response interval duration for the receiving device,
an identification of data types included within the data portion of the payload of the broadcast network discovery frame,
the data portion of the payload of the broadcast network discovery frame, and
a specification of cyclic redundancy data associated with the payload of the broadcast network discovery frame;
operating the sending device to transmit the generated MAC frame over the wireless network;
operating a receiving device to receive the MAC frame over the wireless network;
operating the receiving device to recognize the MAC frame as the indicated frame transmission type; and
operating the receiving device to process the payload portion of the MAC frame in accordance with the payload specification of the distributed asset management protocol corresponding to the indicated frame transmission type.

10. The method for communicating data over the wireless network in accordance with the distributed asset management protocol as recited in claim 9, wherein the device type of the sending device is one of a fixed reader device, a mobile reader device, a handheld device, and a tag device.

11. The method for communicating data over the wireless network in accordance with the distributed asset management protocol as recited in claim 9, wherein the broadcast interval duration of the sending device is an integer value in seconds between successive broadcast periods, wherein each broadcast period is a duration of time during which MAC frames of the broadcast network discovery frame type are successively transmitted at a set interval.

12. The method for communicating data over the wireless network in accordance with the distributed asset management protocol as recited in claim 11, wherein the broadcast interval duration is within a range extending from 1 second to 255 seconds, and wherein the broadcast period duration is 1 second, and wherein the set interval is within a range extending from 6 milliseconds to 19 milliseconds.

13. The method for communicating data over the wireless network in accordance with the distributed asset management protocol as recited in claim 11, wherein the response interval duration for the receiving device is a maximum number of broadcast intervals that are allowed to pass before the receiving device should communicate its status to the sending device.

14. The method for communicating data over the wireless network in accordance with the distributed asset management protocol as recited in claim 9, wherein the type of data included within the data portion of the payload of the broadcast network discovery frame includes one or more of device date and time, device identification, device location, device velocity, and device differential global positioning system correction.

15. A method for communicating data over a wireless network in accordance with a distributed asset management protocol, comprising:
operating a sending device to generate a medium access control (MAC) frame to be transmitted over the wireless network, wherein generating the MAC frame includes,
setting a frame control field of the MAC frame to indicate a command frame transmission type, and
defining a payload portion of the MAC frame to include,
an identification of a device type of the sending device,
an identification of a message type as the command frame,
a specification of a length of data included within the data portion of the payload of the command frame,
an identification of a type of command communicated in the command frame,
the data portion of the payload of the command frame, and
a specification of cyclic redundancy data associated with the payload of the command frame;
operating the sending device to transmit the generated MAC frame over the wireless network;
operating a receiving device to receive the MAC frame over the wireless network;
operating the receiving device to recognize the MAC frame as the indicated frame transmission type; and
operating the receiving device to process the payload portion of the MAC frame in accordance with the payload specification of the distributed asset management protocol corresponding to the indicated frame transmission type.

16. The method for communicating data over the wireless network in accordance with the distributed asset management protocol as recited in claim 15, wherein the device type of the sending device is one of a fixed reader device, a mobile reader device, a handheld device, and a tag device.

17. A method for communicating data over a wireless network in accordance with a distributed asset management protocol, comprising:

operating a sending device to generate a medium access control (MAC) frame to be transmitted over the wireless network, wherein generating the MAC frame includes,
setting a frame control field of the MAC frame to indicate a data frame transmission type, and
defining a payload portion of the MAC frame to include,
an identification of a device type of the sending device,
an identification of a message type as the data frame,
a specification of a length of data included within the data portion of the payload of the data frame,
an identification of a packet type associated with the data included within the data portion of the payload of the data frame,
the data portion of the payload of the data frame, and
a specification of cyclic redundancy data associated with the payload of the data frame;
operating the sending device to transmit the generated MAC frame over the wireless network;
operating a receiving device to receive the MAC frame over the wireless network;
operating the receiving device to recognize the MAC frame as the indicated frame transmission type; and
operating the receiving device to process the payload portion of the MAC frame in accordance with the payload specification of the distributed asset management protocol corresponding to the indicated frame transmission type.

18. The method for communicating data over the wireless network in accordance with the distributed asset management protocol as recited in claim 17, wherein the device type of the sending device is one of a fixed reader device, a mobile reader device, a handheld device, and a tag device.

19. The method for communicating data over the wireless network in accordance with the distributed asset management protocol as recited in claim 17, wherein the identification of the packet type includes identification of the data included within the data portion of the payload of the data frame as either stored data or real-time data.

20. A method for communicating data over a wireless network in accordance with a distributed asset management protocol, comprising:

operating a sending device to generate a medium access control (MAC) frame to be transmitted over the wireless network, wherein generating the MAC frame includes,
setting a frame control field of the MAC frame to indicate a acknowledgement frame transmission type, and
defining a payload portion of the MAC frame to include,
an identification of a device type of the sending device,
an identification of a message type as the acknowledgement frame,
a specification of a length of the acknowledgement frame,
a specification of an acknowledgement value as either successful acknowledgement or failed acknowledgement,
an identification of a sequence number of a communication that is acknowledged by the acknowledgement frame,
an identification of a packet identifier that is acknowledged by the acknowledgement frame in the case of a successful acknowledgement, or an identification of an error type in the case of a failed acknowledgement,
a specification of a ready state of the sending device,
a specification of a incrementing counter value indicating a sequence of processed commands,
a specification of a sleep timer value used by the sending device,
an identification of a current network channel used by the sending device for communication over the wireless network, and
a specification of cyclic redundancy data associated with the payload of the acknowledgement frame;
operating the sending device to transmit the generated MAC frame over the wireless network;
operating a receiving device to receive the MAC frame over the wireless network;
operating the receiving device to recognize the MAC frame as the indicated frame transmission type; and
operating the receiving device to process the payload portion of the MAC frame in accordance with the payload specification of the distributed asset management protocol corresponding to the indicated frame transmission type.

21. The method for communicating data over the wireless network in accordance with the distributed asset management protocol as recited in claim 20, wherein the device type of the sending device is one of a fixed reader device, a mobile reader device, a handheld device, and a tag device.

22. The method for communicating data over the wireless network in accordance with the distributed asset management protocol as recited in claim 20, wherein the specification of the ready state of the sending device is zero if the sending device is ready to receive more data, and wherein the specification of the ready state of the sending device is a number of seconds greater than zero to be delayed before the sending device is ready to receive more data.

* * * * *